(12) United States Patent
Kurokawa et al.

(10) Patent No.: US 11,675,338 B2
(45) Date of Patent: Jun. 13, 2023

(54) CONTROL DEVICE, CONTROL METHOD, AND CONTROL PROGRAM

(71) Applicant: OMRON Corporation, Kyoto (JP)

(72) Inventors: Yoichi Kurokawa, Kyoto (JP); Yasuhiro Kitamura, Kusatsu (JP)

(73) Assignee: OMRON Corporation, Kyoto (JP)

( * ) Notice: Subject to any disclaimer, the term of this patent is extended or adjusted under 35 U.S.C. 154(b) by 414 days.

(21) Appl. No.: 16/643,585

(22) PCT Filed: Feb. 6, 2019

(86) PCT No.: PCT/JP2019/004286
§ 371 (c)(1),
(2) Date: Mar. 1, 2020

(87) PCT Pub. No.: WO2019/176387
PCT Pub. Date: Sep. 19, 2019

(65) Prior Publication Data
US 2020/0257273 A1   Aug. 13, 2020

(30) Foreign Application Priority Data

Mar. 12, 2018 (JP) .............................. JP2018-044128

(51) Int. Cl.
*G05B 19/418*   (2006.01)
(52) U.S. Cl.
CPC .................... *G05B 19/4185* (2013.01); *G05B 2219/31001* (2013.01)
(58) Field of Classification Search
None
See application file for complete search history.

(56) References Cited

U.S. PATENT DOCUMENTS

2004/0093115 A1   5/2004 Usui et al.
2006/0025871 A1*  2/2006 Khalil .................. G05B 9/03
                                                     700/79
(Continued)

FOREIGN PATENT DOCUMENTS

CN    1606289 A    4/2005
CN    2824449 Y   10/2006
(Continued)

OTHER PUBLICATIONS

An extended European search report (EESR) dated Nov. 3, 2021 in a counterpart European patent application.
(Continued)

*Primary Examiner* — Philip Wang
(74) *Attorney, Agent, or Firm* — Metrolex IP Law Group, PLLC

(57) ABSTRACT

A control device includes a program execution module, a communication unit, and a collection module connected to the communication unit. The program execution module generates control instructions for a control target in accordance with a user program that is freely created. The communication unit transmits and/or receives communication data to and/or from an external device through a network. The collection module collects data satisfying a filtering condition from among the communication data that is transferred on the network. The collection module changes the filtering condition in accordance with an instruction included in the user program.

18 Claims, 19 Drawing Sheets

(56) References Cited

U.S. PATENT DOCUMENTS

| | | | |
|---|---|---|---|
| 2007/0109885 A1 | 5/2007 | Mori et al. | |
| 2008/0270058 A1 | 10/2008 | Fujii | |
| 2008/0317031 A1* | 12/2008 | Inoue | H04L 43/028 370/392 |
| 2009/0034412 A1 | 2/2009 | Sakauchi et al. | |
| 2009/0070783 A1 | 3/2009 | Schmidt et al. | |
| 2009/0240351 A1* | 9/2009 | Leong | G05B 19/0426 700/86 |
| 2011/0026407 A1* | 2/2011 | Yamada | G05B 23/0264 370/242 |
| 2015/0022638 A1 | 1/2015 | Saeki | |
| 2017/0235692 A1 | 8/2017 | Ahamed et al. | |
| 2017/0248932 A1 | 8/2017 | Takeuchi et al. | |
| 2017/0366390 A1* | 12/2017 | Takaoka | H04L 41/0604 |
| 2019/0369588 A1* | 12/2019 | Amano | G06F 9/44 |
| 2022/0084631 A1* | 3/2022 | Ju | G16B 20/20 |

FOREIGN PATENT DOCUMENTS

| | | |
|---|---|---|
| CN | 1972591 A | 5/2007 |
| CN | 101295180 A | 10/2008 |
| CN | 101371524 A | 2/2009 |
| CN | 104866484 A | 8/2015 |
| CN | 106533838 A | 3/2017 |
| CN | 107092568 A | 8/2017 |
| CN | 107104954 A | 8/2017 |
| CN | 107132808 A | 9/2017 |
| JP | 2007-141960 A | 6/2007 |
| JP | 2011-035664 A | 2/2011 |
| JP | 2012-156695 A | 8/2012 |
| WO | 2016/143073 A1 | 9/2016 |
| WO | 2018/031769 A1 | 2/2018 |

OTHER PUBLICATIONS

Kazuyoshi Itabashi et al., "Distribution Management Systems", Meiden Review, Oct. 18, 1994, pp. 28-32, Relevance is indicated in the (translated) ISR/WO dated Mar. 26, 2019.

An English translation of the International Search Report("ISR") of PCT/JP2019/004286 dated Mar. 26, 2019.

The Written Opinion("WO") of PCT/JP2019/004286 dated Mar. 26, 2019.

An Office Action (CNOA) dated May 25, 2021 in a counterpart Chinese patent application.

Xu Jian et al., "Linux-based Performance Monitoring of Computing Systems", Journal of Nanjing University of Science and Technology, Oct. 2007, vol. 31, No. 5, School of Computer Science and Technology, NUST, Nanjing 210094, China; Cited in NOA mailed on Feb. 9, 2022.

The Notice of Allowance dated Feb. 9, 2022 in a counterpart Chinese Application.

* cited by examiner

FIG.11

FILTERING CONDITION TABLE 501

| NUMBER | L3 RECEIVE PASS FILTER ||| L4 RECEIVE PASS FILTER ||||
| | SPECIFYING METHOD | IP ADDRESS | SUBNET MASK | PROTOCOL | Range | TCP/UDP PORT ||
| | | | | | | Port1 | Port2 |
| --- | --- | --- | --- | --- | --- | --- | --- |
| 1 | SPECIFYING IP | 10.0.0.1 | 255.255.255.0 | TCP | ☑ | 80 | 100 |
| 2 | SPECIFYING IP | 10.0.0.2 | 255.255.255.0 | FTP | ☐ | 20 | |
| 3 | Interface Network | | | any | ☐ | | |
| 4 | any | | | igmp | ☐ | | |
| 5 | any | | | icmp | ☐ | | |

FILTERING CONDITION TABLE 501a

| NUMBER | L3 RECEIVE PASS FILTER | | | L4 RECEIVE PASS FILTER | | | |
| | SPECIFYING METHOD | IP ADDRESS | SUBNET MASK | PROTOCOL | TCP/UDP PORT | | |
| | | | | | Range | Port1 | Port2 |
|---|---|---|---|---|---|---|---|
| 1 | SPECIFYING IP | 10.0.0.1 | 255.255.255.0 | TCP | ☑ | 80 | 100 |
| 2 | SPECIFYING IP | 10.0.0.2 | 255.255.255.0 | FTP | ☐ | 20 | |
| 3 | Interface Network | | | any | ☐ | | |
| 4 | any | | | igmp | ☐ | | |
| 5 | any | | | icmp | ☐ | | |
| 6 | SPECIFYING IP | 192.168.251.0 | 255.255.255.0 | FTP | ☐ | 20 | |

502  503  504  505  506  507  508  509

ADDED { 6

FIG.19

| SELECT CHECKBOX | PROTOCOL | NUMBER OF COMMUNICATION ERRORS | |
|---|---|---|---|
| | | NUMBER OF TIMEOUTS | NUMBER OF RETRIES |
| ☑ | TCP | 10 | 8 |
| ☐ | FTP | 5 | 0 |
| ⋮ | ⋮ | ⋮ | ⋮ |

LAST 1 HOUR ▽

LAST 30 MINUTES
LAST 1 HOUR
LAST 2 HOUR
⋮

CONTROL DEVICE, CONTROL METHOD, AND CONTROL PROGRAM

TECHNICAL FIELD

This disclosure relates to technologies for collecting communication data using control devices.

BACKGROUND ART

Manufacturing sites using factory automation (FA) techniques have introduced and are using industrial control devices, for example, programmable logic controller (PLC) and robot controllers. The manufacturing steps can be automated by using such control devices to control external devices including different industrial drivers operable to perform network-mediated communications. For example, Japanese Patent Laying-Open No. 2011-35664 (PTL 1) describes a technology relevant to such control devices, which is a facility system using a control device equipped with protocol functions to collect data, for example, capture communication data including frames.

Japanese Patent Laying-Open No. 2012-156695 (PTL 2) describes a communication data collecting apparatus including a transfer engine for communication data such as packets, in which the transfer engine copies data of any of the packets found to satisfy a filtering condition preset by a user and then outputs the copied data to a control processor.

CITATION LIST

Patent Literature

PTL 1: Japanese Patent Laying-Open No. 2011-35664
PTL 2: Japanese Patent Laying-Open No. 2012-156695

SUMMARY OF INVENTION

Technical Problem

Conventionally, a function to collect communication data is available for possible problems during network communications. This function is an effective means for identifying factors causing any communication errors. The networks used in the FA manufacturing sites are required to periodically perform high-speed communications, which may often increase the volume of communication data to be handled. In that case, limited memory capacities of the control devices may be not large enough to capture all of data required to identify the causal factors.

This disclosure addresses such technical issues yet to be solved. In one aspect, this disclosure provides a technology that allows efficient use of any memory capacities by targeting different pieces of data to be collected depending on the current status of a working process.

Solution to Problem

In an example of the technology disclosed herein, a control device is provided that includes: a program execution module that generates control instructions for a control target in accordance with a user program that is freely created; a communication unit that transmits and/or receives communication data to and/or from an external device through a network; and a collection module, connected to the communication unit, that collects data satisfying a filtering condition from among the communication data that is transferred on the network. The collection module changes the filtering condition in accordance with an instruction included in the user program.

The control device thus characterized may allow the filtering condition to be freely changed in accordance with instructions included in the user program.

In an example of the technology disclosed herein, the instruction included in the user program includes an instruction explicitly stating contents of the filtering condition.

The control device thus characterized may allow the filtering condition to be directly changed in accordance with instructions included in the user program.

In an example of the technology disclosed herein, the control device further includes a storage that stores therein a plurality of preset filtering conditions. The instruction included in the user program includes information that indicates which one of the plurality of preset filtering conditions is valid.

The control device thus characterized may allow the filtering condition to be indirectly changed in accordance with instructions included in the user program.

In an example of the technology disclosed herein, the filtering condition includes at least one of an IP address, a protocol, and a port number.

The control device thus characterized may allow the filtering condition to be freely changed for each entry item in accordance with instructions included in the user program.

In an example of the technology disclosed herein, the collection module starts to collect the communication data on the condition that a value of a variable which is usable in the user program matches a predetermined value.

In the control device thus characterized, the timing of collecting the communication data can be freely adjustable.

In an example of the technology disclosed herein, a value of the variable indicates a current status of a working process carried out by the external device.

In the control device thus characterized, the timing of collecting the communication data can be adjustable in accordance with the ongoing working process.

In an example of the technology disclosed herein, a control method for controlling a control target is provided. The control method includes steps of: generating control instructions for the control target in accordance with a user program that is freely created; transmitting and/or receiving communication data to and/or from an external device through a network; and collecting data satisfying a filtering condition from among the communication data that is transferred on the network. In the step of collecting the data, the filtering condition is changeable in accordance with an instruction included in the user program.

The control method thus characterized may allow the filtering condition to be freely changed in accordance with instructions included in the user program.

In an example of the technology disclosed herein, a control program for a control device configured to control a control target is provided. The control program causes the control device to execute the following steps: generating control instructions for a control target in accordance with a user program that is freely created; transmitting and/or receiving communication data to and/or from an external device through a network; and collecting data satisfying a filtering condition from among the communication data that is transferred on the network. In the step of collecting the data, the filtering condition is changeable in accordance with an instruction included in the user program.

The control program thus characterized may allow the filtering condition to be freely changed in accordance with instructions included in the user program.

Advantageous Effects of Invention

In an aspect of the technology disclosed herein, the filtering condition can be freely changed in accordance with instructions included in the user program.

BRIEF DESCRIPTION OF DRAWINGS

FIG. 11 is a diagram that illustrates an exemplified filtering condition table 501.

FIG. 17 is a diagram that illustrates exemplified filtering conditions generated as a result of filtering condition entry items being selected according to embodiments.

FIG. 19 is a diagram that illustrates an image displayed on a display unit 310 of support device 300 according to embodiments, indicating the number of times when data communication errors occur.

DESCRIPTION OF EMBODIMENTS

Embodiments of the technology disclosed herein are hereinafter described referring to the accompanying drawings. In the description below, like components and technical or structural features are illustrated with the same reference signs. Also, they are referred to likewise and have similar functions. Such components and technical or structural features, therefore, will not be repeatedly described in detail.

A. Example of Application

Figure 1:
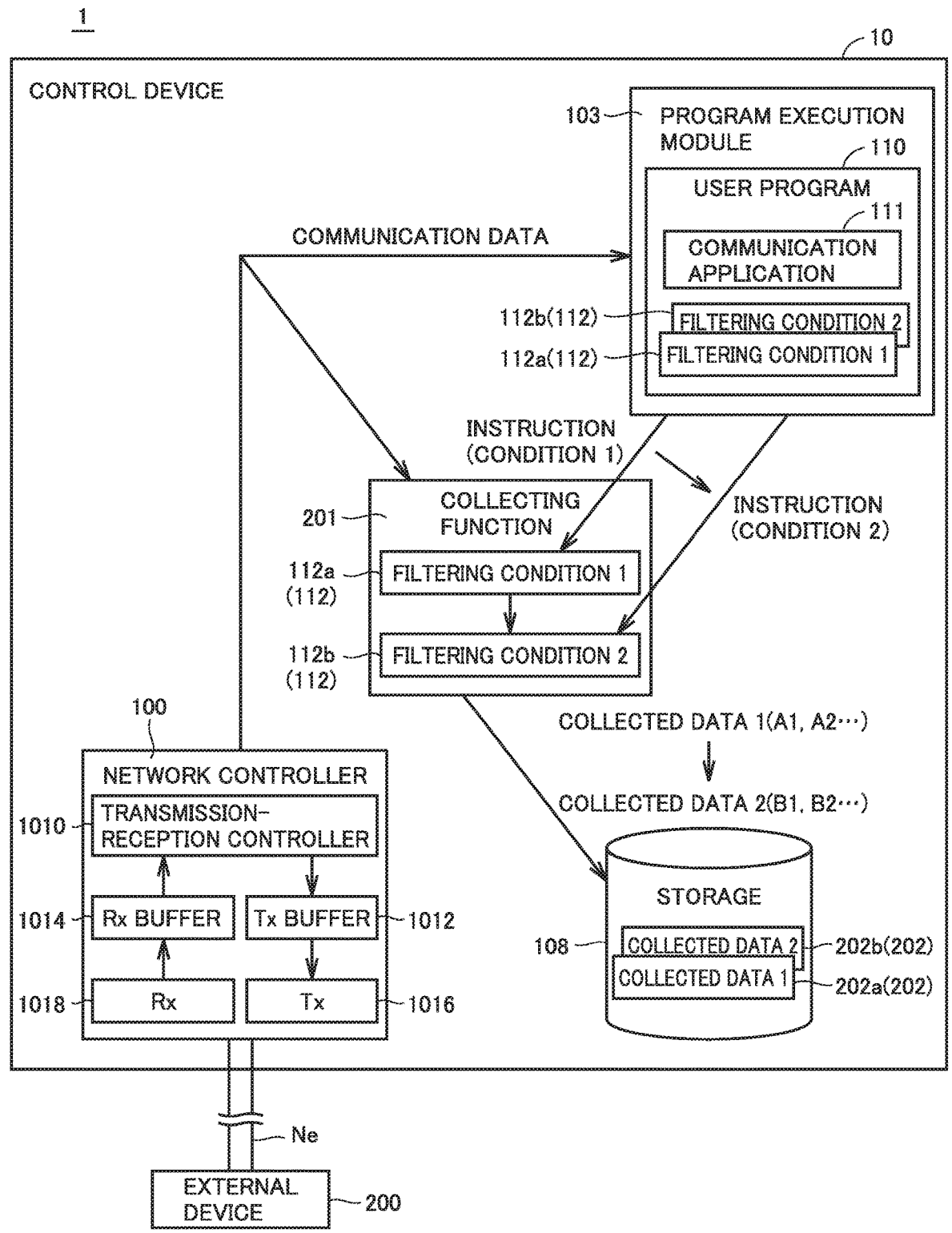
FIG. 1 is a block diagram illustrating a structural example of an FA system 1 according to embodiments.

An example of application of the technology disclosed herein is described below referring to FIG. 1. FIG. 1 is a block diagram illustrating a structural example of an FA system 1 according to embodiments.

FA system 1 is a control system that controls a control target, for example, facility or apparatus, to automate manufacturing steps. FA system 1 includes a control device 10 and an external device 200.

External device 200 includes at least either one of devices that are used during manufacturing steps, for example, an image sensor and an arm robot. The image sensor detects, for example, alphabetical characters and/or images using a camera provided to photograph a workpiece transported during the manufacturing steps. External device 200 includes server devices, for example, a database system and a manufacturing execution system (MES). The arm robot carries out, for example, a machining process to the workpiece.

As a network Ne that interconnects control device 10 and external device 200 may be adopted a typically used network protocol; EtherNET (registered trademark), or an industrial network protocol; EtherNet/IP (registered trademark) or EtherCAT (registered trademark).

Control device 10 includes a network controller 100, a program execution module 103, a collecting function 201, and a storage 108.

Network controller 100 provides an interface that allows control device 10 to transmit and/or receive communication data to and/or from external device 200 through network Ne. Principal components of network controller 100 include a Tx (transmission) buffer 1012, an Rx (reception) buffer 1014, a Tx (transmission) circuit 1016, an Rx (reception) circuit 1018, and a transmission-reception controller 1010. Reception circuit 1018 receives communication data transmitted from external device 200 and writes the received data in reception buffer 1014. The communication data is a collective term for data transmitted through networks, which includes at least either one of packets and frames.

Transmission-reception controller 1010 reads the communication data written in reception buffer 1014 in a sequential order. Transmission-reception controller 1010 outputs the read communication data to program execution module 103.

Transmission-reception controller 1010 writes, in transmission buffer 1012, the data to be transmitted to external device 200 in a sequential order. Transmission circuit 1016 outputs the data currently stored in transmission buffer 1012 to network Ne in a sequential order.

Program execution module 103 transmits and/or receives the communication data to and/or from network controller 100 using a communication application 111. Program execution module 103 generates control instructions for a control target in accordance with a user program 110 that is freely created.

User program 110 is a control program mounted in the device by a designer. The development tool for user program 110 may be installed in a support device such as PC (for example, support device 300 illustrated in FIG. 6). Support device 300 will be described later. The designer can combine different types of predefined instructions on the development tool and thereby design user program 110 suitable for external device 200. The instructions that can be combined on the development tool include filtering conditions set for communication data and control instructions issued for external device 200.

Control device 10 thus characterized transmits and/or receives the communication data to and/or from external device 200 through network Ne to collect (capture) the communication data that satisfy a predefined filtering condition.

As for filtering conditions in the example illustrated in FIG. 1, user program 110 includes communication application 111 and a plurality of filtering conditions 112 (for example, filtering condition 112a, filtering condition 112b).

Communication application 111 is an application that provides communication with network controller 100 to transmit and/or receive the communication data. Filtering conditions 112 are set to filter the communication data and are used when collecting function 201 filters and collects the communication data.

Collecting function 201 changes filtering conditions 112 in accordance with instructions included in user program 110 to collect (capture) the communication data. Collecting function 201 is thus allowed to suitably change the communication data to be filtered in accordance with filtering conditions 112. Collecting function 201 is a program definable with a variety of programs and is used to collect the communication data.

Storage 108 stores therein collected data 202 (for example, collected data 202a, collected data 202b) that are collected in accordance with filtering conditions 112.

When filtering conditions 112 currently set in user program 110 are changed to different conditions, collected data 202 collected under filtering conditions 112 yet to be changed differ from collected data 202 collected under filtering conditions 112 that have been changed. Specifically, collected data 202a collected by collecting function 201 under filtering condition 112a set based on an initial instruction may have contents that differ from the contents of collected data 202b collected by collecting function 201 under filtering condition 112b set based on a next instruction.

Control device 10 thus characterized may allow filtering conditions 112 to be freely changed in accordance with instructions included in user program 110.

Further, control device 10, by allowing the filtering conditions of collecting function 201 to be changed in accordance with instructions included in the user program, can dynamically change contents of the communication data to be collected. Thus, different pieces of communication data can be successfully collected depending on the current processing status. This may allow a particular piece(s) of the communication data needed to identify causal factors to be selectively collected in the case of any problems in data communication, allowing efficient use of a limited memory capacity of control device 10.

B. Hardware Components of Control Device

Figure 2:
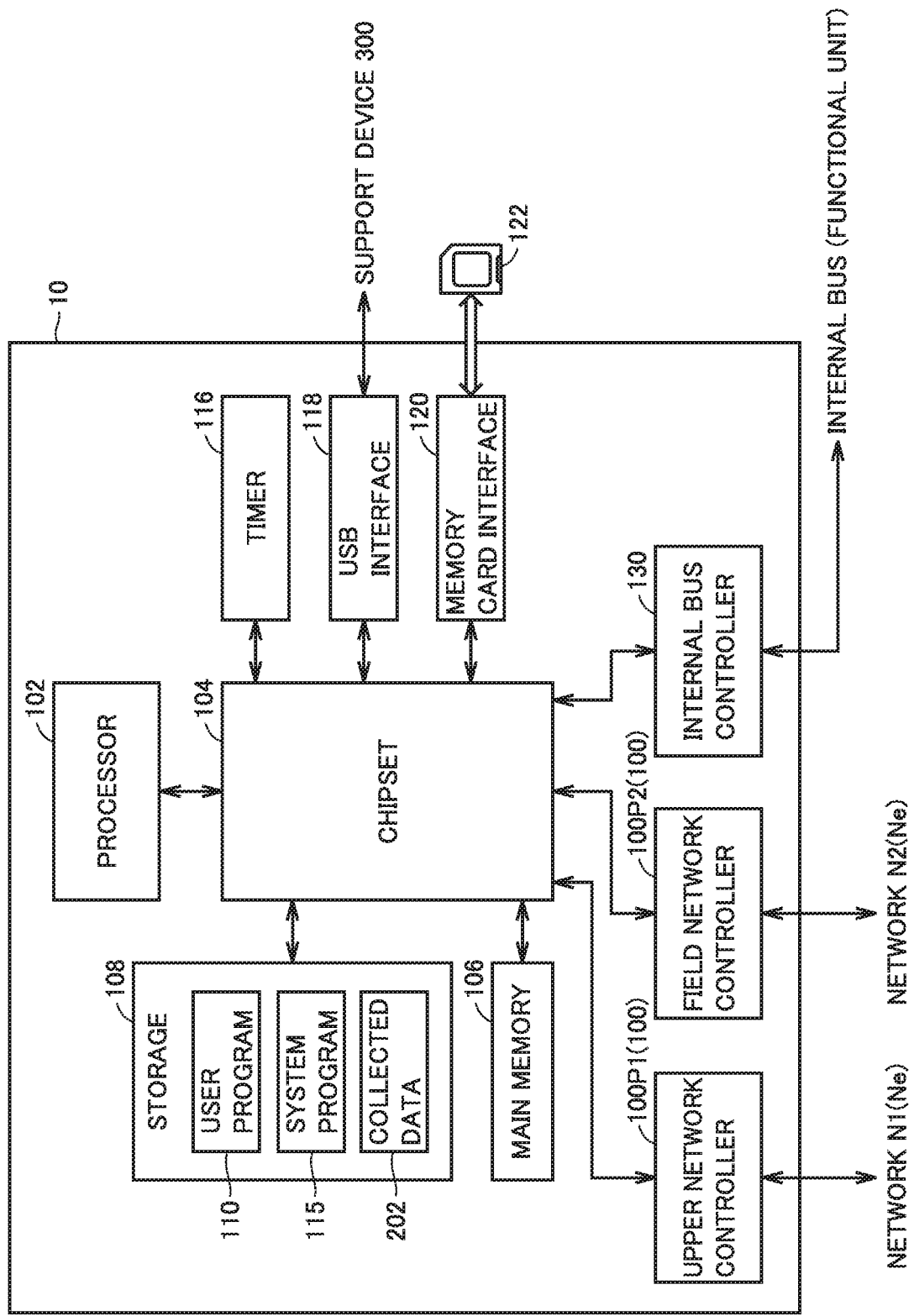
FIG. 2 is a block diagram illustrating exemplified hardware components of a control device 10 according to embodiments.

FIG. 2 is a block diagram that illustrates exemplified hardware components of control device (hereinafter, may be referred to as "controller") 10 according to embodiments. Referring to FIG. 2, controller 10 includes a processor 102, a chipset 104, a main memory 106, and storage 108. Controller 10 further includes a timer 116, a USB (Universal Serial Bus) interface 118, and a memory card interface 120.

Controller 10 further includes an internal bus controller 130, an upper network controller 100P1, and a field network controller 100P2.

Structural elements of processor 102 include a central processing unit (CPU), a micro processing unit (MPU), and a graphics processing unit (GPU). Processor 102 may be a processor including a plurality of cores or may be a plurality of processors 102 that are disposed in arrangement. Controller 10 is thus provided with one or more processors 102 and/or a processor 102 having one or more cores.

Chipset 104 controls processor 102 and its peripheral elements to control all of the processes to be executed by controller 10. Main memory 106 includes volatile storage devices, for example, dynamic random access memory (DRAM) and static random access memory (SRAM). Storage 108 includes a volatile storage device(s), for example, flash memory.

Processor 102 reads programs stored in storage 108, and then loads and runs the read programs on main memory 106 to allow appropriate control of any control target. Storage 108 includes, as well as user program 110 run to execute basic processes of control device 10, a system program 115. User program 110 includes filtering conditions 112, while system program 115 includes collecting function 201.

Storage 108 also stores therein collected data 202 which is the communication data satisfying filtering condition 112.

Timer 116 is a device synchronized in time with external device 200. External device 200, such as the camera or arm robot, is driven in accordance with time-related information of this timer. An example of information associated with the time-related information of timer 116 is information that indicates coordinate positions of external device 200.

USB interface 118 mediates data communication to and from a USB-connected device(s). For example, USB interface 118 provides interconnection between the control device and support device 300.

Memory card interface 120 is detachably mountable with memory card 122. Various pieces of data (for example, user program, trace data) can be written in and read from memory card 122.

Upper network controller 100P1 (100) is operable to mediate transmission and reception of communication data through network N1 to and from external device 200, for example, a server. The server includes a database system and a manufacturing execution system (MES).

Field network controller 100P2 (100) is operable to mediate transmission and reception of communication data through network N2 to and from external devices 200, for example, devices used during manufacturing steps. The devices used during manufacturing steps may be, for example, an image sensor, a camera, a remote I/O device, and an arm robot.

Internal bus controller 130 mediates transmission and reception of communication data to and from functional units mounted in controller 10.

In FIG. 2 is illustrated a structural example in which required processes are executed when processor 102 runs the programs. Instead, these processes to be executed may be implemented in part or in whole by using dedicated hardware circuits (for example, ASIC or FPGA).

C. Change of Filtering Condition

Next, an exemplified process is hereinafter described, in which collecting function 201 changes filtering conditions 112 in accordance with instructions included in the user program. While a function block diagram (FBD) is used in the description below, one of the ladder diagram (LD), instruction list (IL), structured text (ST) and sequential function chart (SFC) may be selected, or two or more of them may be combined and used to execute this process. Instead, one selected from other program languages may be employed to execute this process, for example, a universal program language such as JavaScript (registered trademark) or C language.

Figure 3:
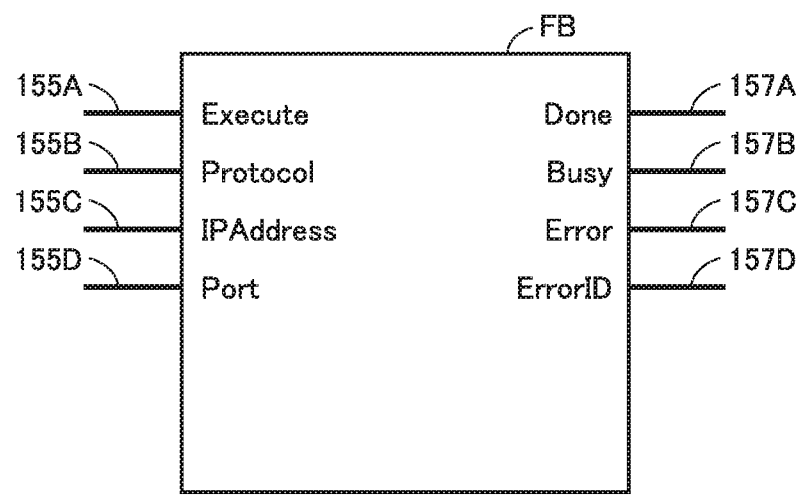
FIG. 3 is a diagram that illustrates a function block FB according to embodiments.

FIG. 3 is a diagram that illustrates a function block FB according to embodiments. Collecting function 201 changes the filtering conditions in accordance with instructions included in user program 110. The instructions included in user program 110 may be, for example, defined with function block FB.

Function block FB includes input units 155A to 155D for input of filtering conditions 112 to be set, and output units 157A to 157D for output of a filtering condition setting result.

Input units 155A to 155D receive input of filtering conditions 112 to be set. Filtering conditions 112 are changeable with values inputted to input units 155A to 155D. The values thus inputted may be specific values, for example, "Protocol", "IP Address", and "Port", as described later. The instructions included in the user program include instructions explicitly stating contents of filtering condition 112. By using such direct instructions, collecting function 201 is allowed to freely change the filtering conditions under which communication data is collected.

Input unit 155A with "Execute" in FIG. 3 receives an input that designates whether the process to change filtering condition 112 should be executed. For example, input unit 155A receives an input, "True" or "False". Collecting function 201 does not change filtering condition 112 insofar as input unit 155A receives the input of "False". When input unit 155A receives the input of "True", on the other hand, collecting function 201 changes the filtering condition. In this instance, filtering condition 112 inputted to the other input unit, 155B to 155D, is newly set as filtering conditions 112. Controller 10 is thus allowed to directly change filtering conditions 112 in accordance with instructions included in user program 110.

Input unit 155B illustrated with "Protocol" in FIG. 3 receives an input that designates the communication protocol of communication data to be filtered. For example, input unit 155B receives the input of information that identifies a communication protocol. This identification information may be designated with the name of the communication protocol or may be designated with identification (ID) of the communication protocol. For example, input unit 155B receives an input, "TCP" or "FTP". When "TCP" is inputted to input unit 155B, collecting function 201 changes filtering condition 112 so that communication data that complies with the TCP protocol is selected as data to be filtered. When "FTP" is inputted to input unit 155B, on the other hand, collecting function 201 changes the filtering condition so that communication data that complies with the FTP protocol is selected as data to be filtered. Thus, controller 10 is allowed to freely change the protocol condition which is an entry of the condition to be set for collecting the communication data.

Input unit 155C illustrated with "IP address" in FIG. 3 receives an input that specifies the IP address of communication data to be filtered corresponding to a device. When, for example, "10.0.0.1" is inputted to input unit 155C, collecting function 201 changes filtering condition 112 so that communication data transmitted to a device with the IP address of "10.0.0.1" (destination device) is selected as data to be filtered. Thus, controller 10 is allowed to freely change the IP address condition which is an entry of the condition to be set for collecting the communication data.

Input unit 155D with "Port" in FIG. 3 receives an input that designates the port number of the communication data to be filtered corresponding to a device. When, for example, "80" is inputted to input unit 155D, collecting function 201 changes filtering condition 112 so that the communication data transmitted to a device with the port number of "80" (destination device) is selected as data to be filtered. Thus, controller 10 is allowed to freely change the port number which is an entry of the condition to be set for collecting the communication data.

Controller 10 is thus allowed to freely change filtering condition 112 for each one of its entries in accordance with instructions included in user program 110.

In the description given so far, three entries, "Protocol", "IP Address", and "Port", are settable as filtering condition 112. Instead, the condition may consist of at least one of these three entries or may consist of four or more including these three entries.

When filtering condition 112 is set as normally done, a signal indicative of the success of condition setting is outputted from output unit 157A illustrated with "Done" in FIG. 3. While filtering condition 112 is being changed, a signal indicative of the ongoing filtering condition change is outputted from output unit 157B illustrated with "Busy" in FIG. 3. When filtering condition 112 fails to be properly set, a signal indicative of the condition setting error is outputted from output unit 157C illustrated with "Error" in FIG. 3. In this instance, an error ID for identifying details of the error is outputted from output unit 157D illustrated with "ErrorID" in FIG. 3.

Function block FB may include, in addition to input units 155A to 155D and output units 157A to 157D, other variously different input and output units. For example, function block FB may include an input unit(s) that designates a communication interface in the case of a plurality of communication interfaces.

D. Example of Program

Figure 4:
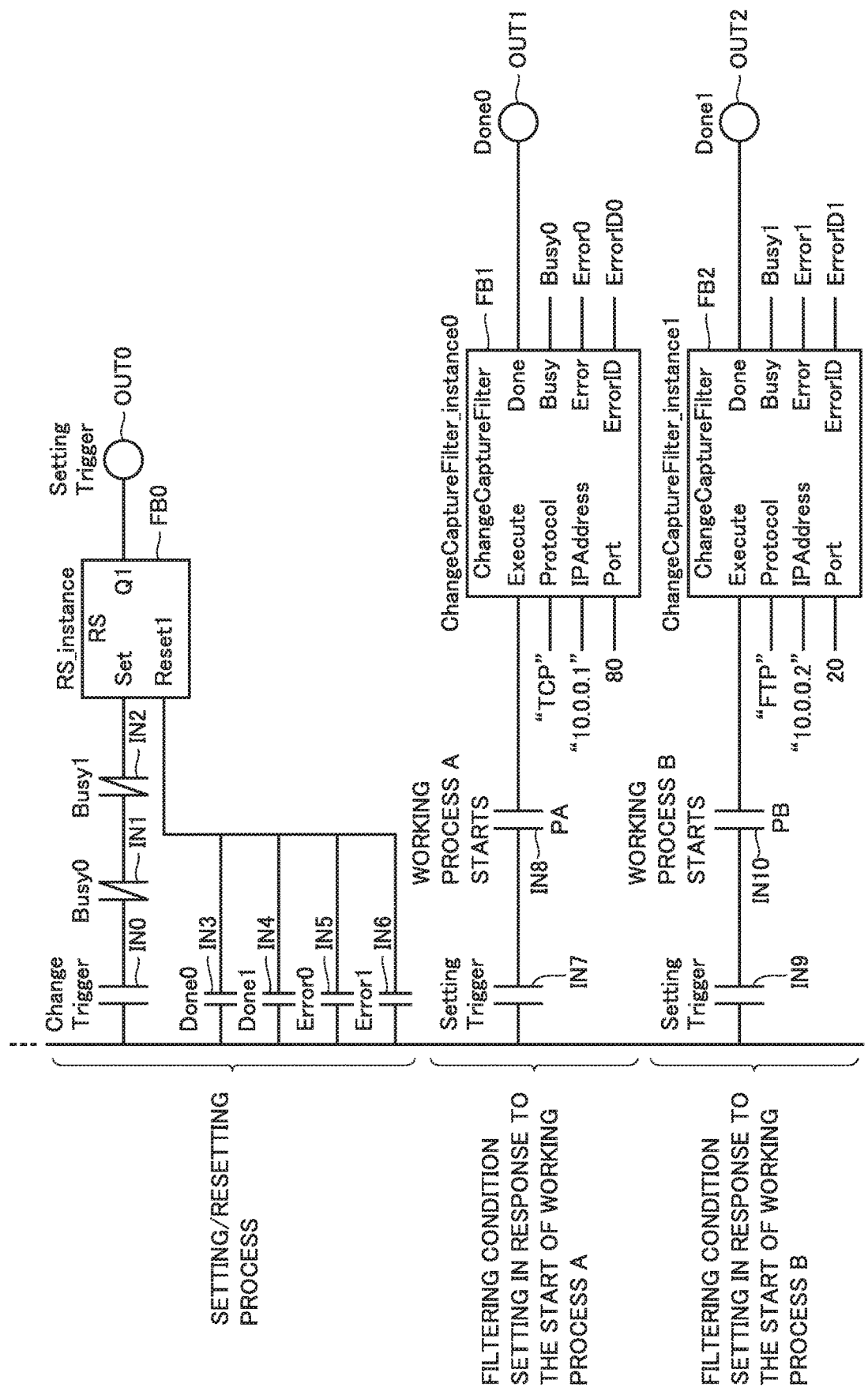
FIG. 4 is a diagram that illustrates an exemplified user program embedded with the function block FB described with reference to FIG. 3.

An exemplified use of function block FB illustrated in FIG. 3 is hereinafter described referring to FIG. 4. FIG. 4 is a diagram that illustrates an exemplified user program embedded with function block FB described with reference to FIG. 3.

In the example illustrated in FIG. 4, user program 110 is defined with the ladder program. This user program 110 is so defined that filtering condition 112 of communication data is changeable in accordance with the working process of external device 200. Specifically, collecting function 201 starts to collect communication data on the condition that a variable indicative of the current status of the working process usable in the user program indicates a predetermined value. The working process refers to all of steps from the start to end of an intended process(es) carried out by one or more external devices 200.

User program 110 illustrated in FIG. 4 does not present the whole process to be executed by controller 10. For example, logics at the time of shifting steps of the working process are partly not illustrated in FIG. 4.

User program 110 is defined with input elements IN0 to IN10, function blocks FB0 to FB2, and output elements OUT0 to OUT2. Function blocks FB1 and FB2 are both equivalent to function block FB described with reference to FIG. 3.

The values of input elements IN0 to IN10 are changeable with variables allocated to these elements. Specifically, a variable, "ChangeTrigger", is allocated to input element IN0. The "ChangeTrigger" is a variable of BOOL type, and its initial value is "False" (=OFF). The value of variable "ChangeTrigger" changes to "True" (ON) in response to controller 10 being activated. In any other events, the value of variable "ChangeTrigger" is "False" (OFF).

A variable, "Busy0", is allocated to input element IN1. The "Busy0" is a variable of BOOL type. Variable "Busy0" is associated with an output, "Busy", of function block FB1. Thus, the value of input element IN1 is changeable with the value of output "Busy" of function block FB1. As described earlier, while filtering condition 112 is being changed, a signal indicative of the ongoing condition change, "True" (=ON), is outputted from output "Busy" of function block FB1. The value of variable "Busy0" of input element IN1 is opposite to the value of output "Busy" of function block FB1. The value of input element IN1, therefore, is "False" (=OFF) when output "Busy" of function block FB1 has the value of "True" (=ON). When output "Busy" of function block FB1 has the value of "False" (=OFF), on the other hand, the input element IN1 has the value of "True" (=ON).

A variable, "Busy1", is allocated to input element IN2. The "Busy1" is a variable of BOOL type. Variable "Busy1" is associated with an output, "Busy", of function block FB2. Thus, the value of input element IN2 is changeable with the value of output "Busy" of function block FB2. As described earlier, while filtering condition 112 is being changed, a signal indicative of the ongoing condition change, "True" (=ON), is outputted from output "Busy" of function block FB2. The value of variable "Busy1" of input element IN2 is opposite to the value of output "Busy" of function block FB2. The value of input element IN2, therefore, is "False" (=OFF) when output "Busy" of function block FB2 has the value of "True" (=ON). When output "Busy" has the value of "False" (=OFF), on the other hand, input element IN2 has the value of "True" (=ON).

A variable, "Done0", is allocated to input element IN3. The "Done0" is a variable of BOOL type, and its initial value is "False" (=OFF). Variable "Done0" is associated with an output, "Done", of function block FB1. As described earlier, when filtering condition 112 is changed as normally done, a signal indicative of the success of condition change, "True" (=ON), is outputted from output "Done" of function block FB1. When output "Done" of function block FB1 is "True" (=ON), the value of input element IN3 is "True" (=ON). When output "Done" of function block FB1 is "False" (=OFF), the value of input element IN3 is "False" (=OFF).

A variable, "Done1", is allocated to input element IN4. The "Done1" is a variable of BOOL type, and its initial value is "False" (=OFF). Variable "Done1" is associated with an output, "Done", of function block FB2. As described earlier, when filtering condition 112 is changed as normally done, a signal indicative of the success of condition change, "True" (=ON), is outputted from output "Done" of function block FB2. When output "Done" of function block FB2 is "True" (=ON), the value of input element IN4 is "True" (=ON). When output "Done" of function block FB2 is "False" (=OFF), the value of input element IN4 is "False" (=OFF).

A variable, "Error0", is allocated to input element IN5. The "Error0" is a variable of BOOL type, and its initial value is "False" (=OFF). Variable "Error0" is associated with an output, "Error", of function block FB1. As described earlier, when the process to change filtering condition 112 fails, a signal indicative of the failure of condition change, "True" (=ON), is outputted from output "Error" of function block FB1. When output "Error" of function block FB1 is "True" (=ON), the value of input element IN5 is "True" (=ON). When output "Error" of function block FB1 is "False" (=OFF), the value of input element IN5 is "False" (=OFF).

A variable, "Error1", is allocated to input element IN6. The "Error1" is a variable of BOOL type, and its initial value is "False" (=OFF). Variable "Error1" is associated with an output, "Error", of function block FB2. As described earlier, when the process to change filtering condition 112 fails, a signal indicative of the failure of condition change, "True" (=ON), is outputted from output "Error" of function block FB2. When output "Error" of function block FB2 is "True" (=ON), the value of input element IN6 is "True" (=ON). When output "Error" of function block FB2 is "False" (=OFF), the value of input element IN6 is "False" (=OFF).

A variable, "SettingTrigger", is allocated to input element IN7. The "SettingTrigger" is a variable of BOOL type, and its initial value is "False" (=OFF). Variable "SettingTrigger" is associated with an output, "Q1", of function block FB0. When output "Q1" of function block FB0 is "True" (=ON), the value of input element IN7 is "True" (=ON). When output "Q1" of function block FB0 is "False" (=OFF), the value of input element IN7 is "False" (=OFF).

A variable, "PA", is allocated to input element IN8. The "PA" is a variable of BOOL type, and its initial value is "False" (=OFF). Though not illustrated in FIG. 4, user program 110 includes a control function defined to perform a working process A. This control function outputs control instructions to external device 200 in accordance with specifics of control provided therein. The control function is so defined that the value of variable "PA" is set to "True" (=ON) during the ongoing working process A and is set to "False" (=OFF) otherwise. Thus, filtering condition 112 suitable for working process A is set by function block FB1 on the condition that variable "PA" usable in user program 110 has a predetermined value (for example, "True").

A variable, "SettingTrigger", is allocated to input element IN9. The "SettingTrigger" is a variable of BOOL type, and its initial value is "False" (=OFF). Variable "SettingTrigger" is associated with output "Q1" of function block FB0. When output "Q1" of function block FB0 is "True" (=ON), the value of input element IN9 is "True" (=ON). When output "Q1" of function block FB0 is "False" (=OFF), the value of input element IN9 is "False" (=OFF).

A variable, "PB", is allocated to input element IN10. The "PB" is a variable of BOOL type, and its initial value is "False" (=OFF). Though not illustrated in FIG. 4, user program 110 includes a control function defined to perform a working process B. This control function outputs control instructions to external device 200 in accordance with specifics of control provided therein. The control function is so defined that the value of variable "PB" is set to "True" (=ON) during the ongoing working process B and is set to "False" (=OFF) otherwise. Thus, filtering condition 112 suitable for working process B is set by function block FB2 on the condition that variable "PB" usable in user program 110 has a predetermined value (for example, "True").

Next, function blocks FB0, FB1 and FB2 are hereinafter described in detail. Function block FB0 is a program for executing a reset process when working process A or working process B starts. Function block FB0 includes input units "Set" and "Reset1" and an output unit "Q1". When variable "ChangeTrigger" is "True" (=ON) and variables "Busy0" and "Busy1" are "False" (=OFF), a valid signal, "True"

(=ON), is inputted to input unit "Set". Otherwise, an invalid signal, "False" (=OFF), is inputted to input unit "Set".

When variable "Done0" shows the value of "True" (=ON), the valid signal, "True" (=ON), is inputted to input unit "Reset1". When variable "Done1" shows the value of "True" (=ON), the valid signal, "True" (=ON), is inputted to input unit "Reset1". When variable "Error0" shows the value of "True" (=ON), the valid signal, "True" (=ON), is inputted to input unit "Reset1". When variable "Error1" shows the value of "True" (=ON), the valid signal, "True" (=ON), is inputted to input unit "Reset1".

Otherwise, the invalid signal, "False" (=OFF), is inputted to input unit "Reset1". In response to the valid signals being inputted to input units "Set" and "Reset1" both, function block FB0 starts to execute the reset process in connection with working process A. When the reset process is normally ended, the value of output unit "Q1" of function block FB0 is "True" (=ON).

Function block FB1 is a program for changing filtering condition 112 of communication data. This function block is equivalent to instructions included in user program 110. When variable "SettingTrigger" is "True" (=ON) and variable "PA" is "True" (=ON), the valid signal, "True" (=ON), is inputted to input unit "Execute" of function block FB1. In response to this signal being inputted, function block FB1 executes the process to change filtering condition 112.

Specifically, function block FB1 sets, as new filtering condition 112, filtering condition 112 that follows "TCP" inputted to input unit "Protocol", "10.0.0.1" inputted to input unit "IP Address", and "80" inputted to input unit "Port". How to change filtering condition 112 is described earlier with reference to FIG. 3 and is not described again.

Function block FB2 is a program for changing filtering condition 112 of communication data. This function block is equivalent to instructions included in user program 110. When variable "SettingTrigger" is "True" (=ON) and variable "PB" is "True" (=ON), the valid signal, "True" (=ON), is inputted to input unit "Execute" of function block FB2. In response to this signal being inputted, function block FB2 executes the process to change filtering condition 112.

Specifically, function block FB2 sets, as new filtering condition 112, filtering condition 112 that follows "FTP" inputted to input unit "Protocol", "10.0.0.2" inputted to input unit "IP Address", and "20" inputted to input unit "Port". Filtering condition 112b set by function block FB2, therefore, differs from filtering condition 112a set by function block FB1.

Controller 10 is accordingly allowed to freely adjust the timing of collecting communication data. Specifically, controller 10 is allowed to adjust the timing of collecting communication data in accordance with the ongoing working process.

This may allow controller 10 with only a limited memory capacity to efficiently collect an enough volume of communication data to identify factors causing any communication errors.

The values of output elements OUT0 to OUT2 are changeable with output values of function blocks associated with these elements. The variable, "SettingTrigger", is allocated to output element OUT0. Output element OUT0 is associated with output "Q1" of function block FB0. The value of output element OUT0 is, therefore, changeable with the value of output "Q1".

The variable, "Done0", is allocated to output element OUT1. Output element OUT1 is associated with output "Done" of function block FB1. The value of output element OUT1 is, therefore, changeable with the value of output "Done" of function block FB1.

The variable, "Done1", is allocated to output element OUT2. Output element OUT2 is associated with output "Done" of function block FB2. The value of output element OUT2 is, therefore, changeable with the value of output "Done" of function block FB2.

Thus, filtering condition 112a inputted to function block FB1 is set during working process A depending on a value of the variable indicative of the current status of this working process, while filtering condition 112b inputted to function block FB2 is set during working process B depending on a value of the variable indicative of the current status of this working process.

Figure 5:
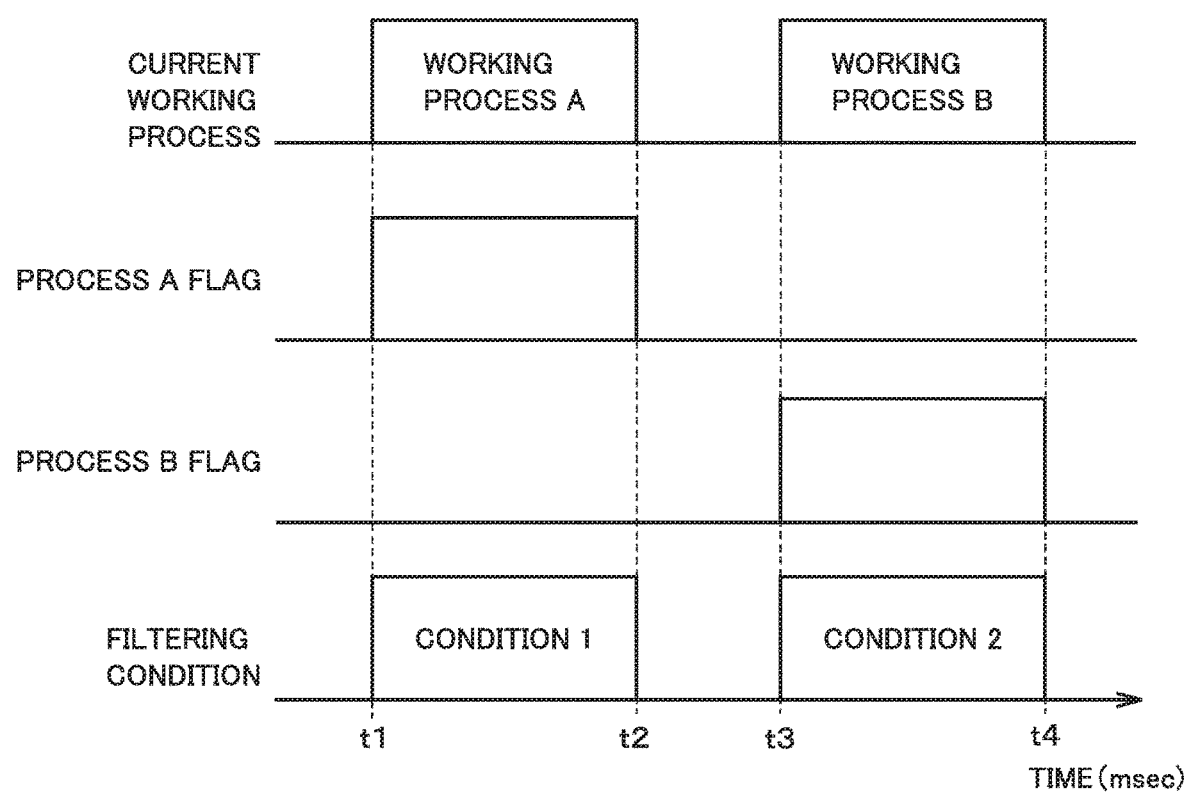
FIG. 5 is a diagram that illustrates a corresponding relationship between the start and end of working processes and filtering conditions set in the working processes.

The filtering condition changing process thus performed is described referring to FIG. 5. FIG. 5 is a diagram that illustrates a corresponding relationship between the start and end of working processes and filtering conditions set in the working processes. In FIG. 5 are illustrated statuses of the ongoing working processes over time (msec), values of variables indicative of the start and end of the working processes, and filtering conditions suitably set for the working processes. To start with, working process A starts to be executed at time t1. When the value of variable "PA" in working process A turns to "True" (start of process=process A flag ON), filtering condition 112a (filtering condition 1) is set in collecting function 201 in accordance with instructions included in the user program.

At time t2 when working process A ends and the value of variable "PA" of working process A turns to "False" (end of process=process A flag OFF), collecting function 201 ceases to collect communication data based on filtering condition 112a.

At time t3, working process B starts to be executed at time t3. When the value of variable "PB" in working process B turns to "True" (start of process=process B flag ON), filtering condition 112b (filtering condition 2) is set in collecting function 201 in accordance with instructions included in the user program.

At time t4 when working process B ends and the value of variable "PB" of working process B turns to "False" (end of process=process B flag OFF), collecting function 201 ceases to collect communication data based on filtering condition 112b.

By thus selectively setting the filtering condition suitable for each working process, communication data that can identify error-causing factors in different working processes can be easily collected.

Figure 6:
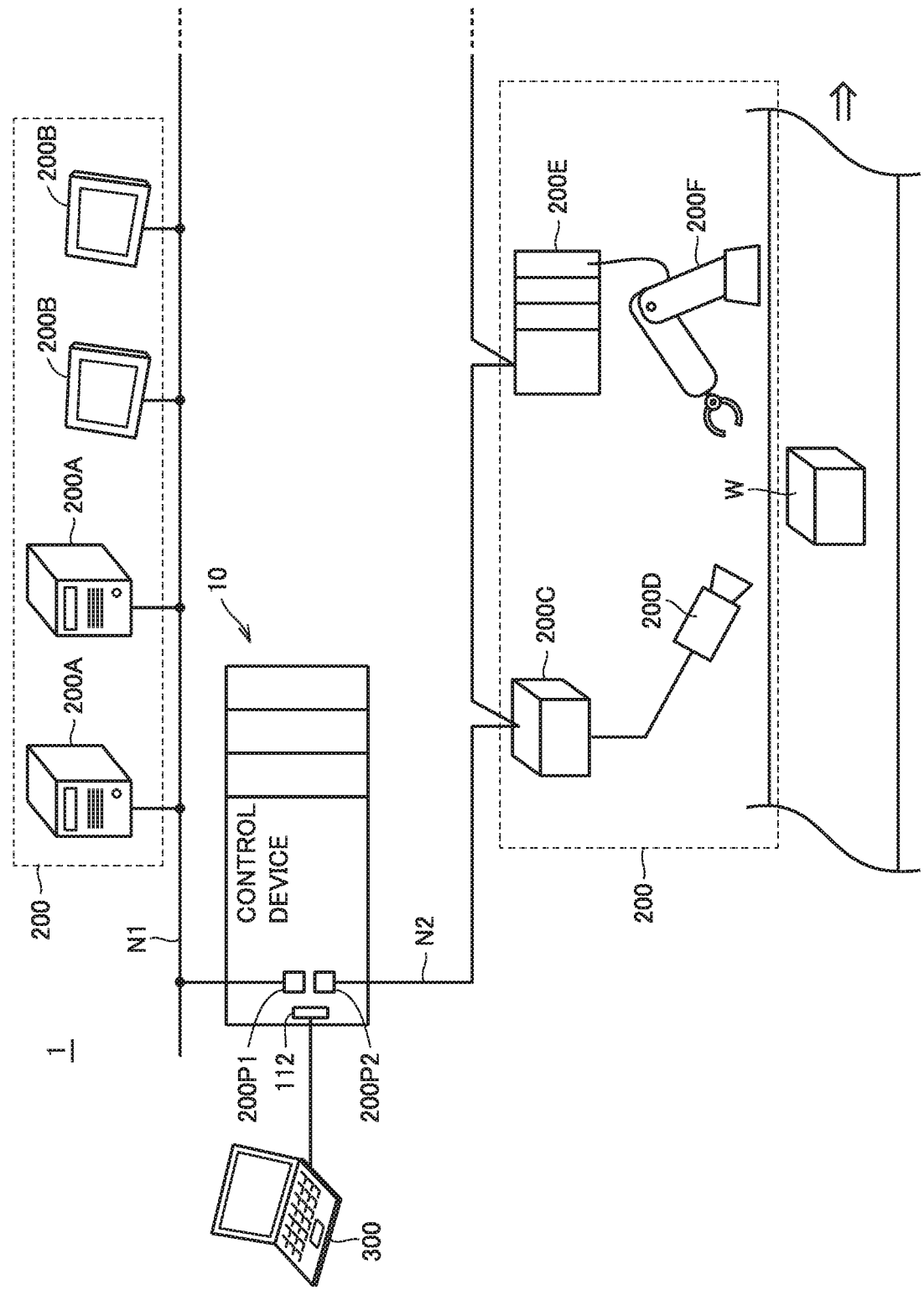
FIG. 6 is a diagram that schematically illustrates FA system 1 according to embodiments.

A specific example of FA system 1 according to embodiments is hereinafter described. FIG. 6 is a diagram that schematically illustrates FA system 1 according to embodiments.

FA system 1 includes controller 10, external device 200, and support device 300.

Controller 10 is connectable to a plurality of networks. In the example of FIG. 6, a communication port 200P1 of controller 10 is connected to an upper network N1, while a communication port 200P2 of controller 10 is connected to a lower-order network N2. Upper network N1 may be, for example, the EtherNET (registered trademark). The lower-order network N2 may preferably be a network that allows fixed-cycle communication that guarantees data arrival time, examples of which include the EtherNet/IP (registered trademark) and EtherCAT (registered trademark). Network N1 and N2 are not necessarily limited to the given examples and may be freely selected from other suitable means for communication.

External device 200 in upper network N1 may be, for example, at least one of a server 200A and a display unit 200B. Server 200A includes a database system and a manufacturing execution system (MES). The manufacturing execution system obtains information from a control target; apparatus or facility for manufacture, to monitor and manage the whole production process. This system can also handle other pieces of information regarding, for example, placed order, product quality, and shipment. This system is not necessarily thus configured. An apparatus that provides information-based services (for example, obtain various pieces of information from a control target and subject them to macroscopic or microscopic analysis) may be connected to network N1. Controller 10, by using user program 110 and collecting function 201 operating in coordination, causes a filtering process to be executed for communication data obtained in accordance with the working process of server 200A.

Specifically, filtering condition 112 is changed in a manner suitable for the ongoing working process of server 200A on the condition that a value of the variable that is usable in user program 110 indicating the current status of this working process matches a predetermined value. Thus, filtering conditions 112 of the function blocks are changed. Collecting function 201 filters and collects the communication data based on the filtering condition that has been changed.

Display unit 200B graphically displays thereon, for example, a computation result obtained by controller 10 and outputs a command to controller 10 in answer to a user's operation. Controller 10, by using user program 110 and collecting function 201 operating in coordination, causes a filtering process to be executed for communication data obtained in accordance with the working process of display unit 200B.

Specifically, filtering condition 112 is set in a manner suitable for the working process of display unit 200B on the condition that a value of the variable that is usable in user program 110 indicating the current status of this working process matches a predetermined value. Thus, filtering conditions 112 of the function blocks are changed. Collecting function 201 filters and collects the communication data based on filtering condition 112 that has been changed.

Support device 300 provides a designer with an environment where user program 110 can be developed and designed. Examples of support device 300 may include laptop computers, desktop computers, tablet terminals, and smart phones. The designer can design user program 110 on support device 300 and download this user program 110 into controller 10 through USB interface 118.

External device 200 in lower-order network N2 may include, for example, at least one of an image sensor 200C, a camera 200D, a remote I/O device 200E, and an arm robot 200F. Controller 10 and external device 200 in lower-order network N2 may be, for example, daisy-chain connected to each other.

For example, image sensor 200C executes a working process, in which image data of a workpiece W photographed with camera 200D is subjected to an image measuring process, like pattern matching, and the obtained result is outputted to controller 10.

Specifically, filtering condition 112 is changed in a manner suitable for the working process of image sensor 200C on the condition that a value of a variable usable in user program 110 that indicates the current status of this working process matches a predetermined value. Collecting function 201 filters and collects the communication data based on filtering condition 112 that has been changed.

Remote I/O device 200E controls arm robot 200F in accordance with a control command outputted from controller 10. For example, controller 10 outputs, to remote I/O device 200E, a control command that prompts arm robot 200F to carry out a predetermined working process in accordance with the working process of image sensor 200C. Remote I/O device 200E controls arm robot 200F in accordance with this control command. For example, remote I/O device 200E provides a control command that prompts the arm robot to remove, from a conveyer, workpiece W inspected and determined as poor in quality. The feedback of the current status of arm robot 200F (for example, positions and angles of its joints) is outputted in a sequential order from remote I/O device 200E to controller 10.

Specifically, filtering condition 112 is changed in a manner suitable for the working process of remote I/O device 200E on the condition that a value of a variable usable in user program 110 that indicates the current status of this working process matches a predetermined value. Collecting function 201 filters and collects the communication data based on the filtering condition that has been changed.

E. Data Structure of Communication Data

Figure 7:
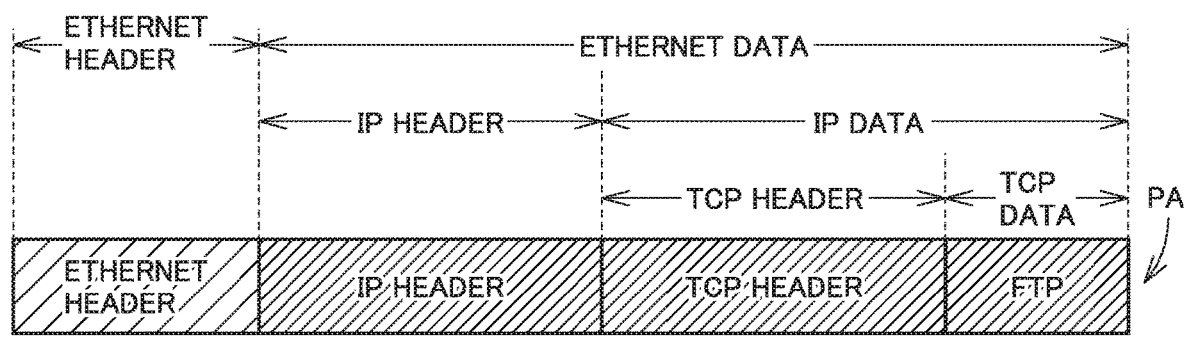
FIG. 7 is a diagram that illustrates an example of communication data to be filtered according to embodiments.

The communication data to be filtered by controller 10 may be any data transmittable through the network. FIG. 7 is a diagram that illustrates an example of communication data to be filtered according to embodiments. An example of communication data to be filtered by controller 10 is hereinafter described referring to FIG. 7.

The communication data to be filtered by controller 10 may include, for example, communication packets that comply with the TCP/IP protocol.

External device 200, which is the source of transmitted data, divides the data to be transmitted into communication packets and transmits the divided communication packets in a sequential order to controller 10. In FIG. 7, one of the communication packets divided by the source device is illustrated as a communication packet PA.

The communication packet PA includes an Ethernet header; header of the Ethernet protocol, and Ethernet data; data of the Ethernet protocol. The Ethernet data includes an IP header; header of the IP protocol, and IP data; data of the IP protocol. The IP data includes a TCP header; header of the TCP protocol, and TCP data; data of the TCP protocol.

The IP header of communication packet PA may include, for example, the IP address of external device 200 which is the source device (for example, server 200A), IP address of controller 10 which is the destination device, and a communication protocol. The TCP header of communication packet PA includes the port number of the source device and the port number of the destination device. The TCP data of communication packet PA includes contents of the data to be transmitted. The data to be transmitted may include, for example, variables that respectively indicate the status of external device 200, and instructions to obtain the variables. The variables described herein refer to variables included in user program 110. These variables are changeable with statuses of the components of external device 200.

In response to receipt of communication packet PA, controller 10 extracts, from communication packet PA, information for comparison with filtering condition 112. This information includes at least one of the IP address of the source device, IP address of the destination device, communication protocol, port number of the source device, and port number of the destination device. Controller 10 determines whether the information extracted from communication packet PA satisfies filtering condition 112. When the information extracted from communication packet PA is determined as satisfying filtering condition 112, controller 10 selects communication packet PA as the filtering target.

F. Configuration for Control of Controller 10

Figure 8:
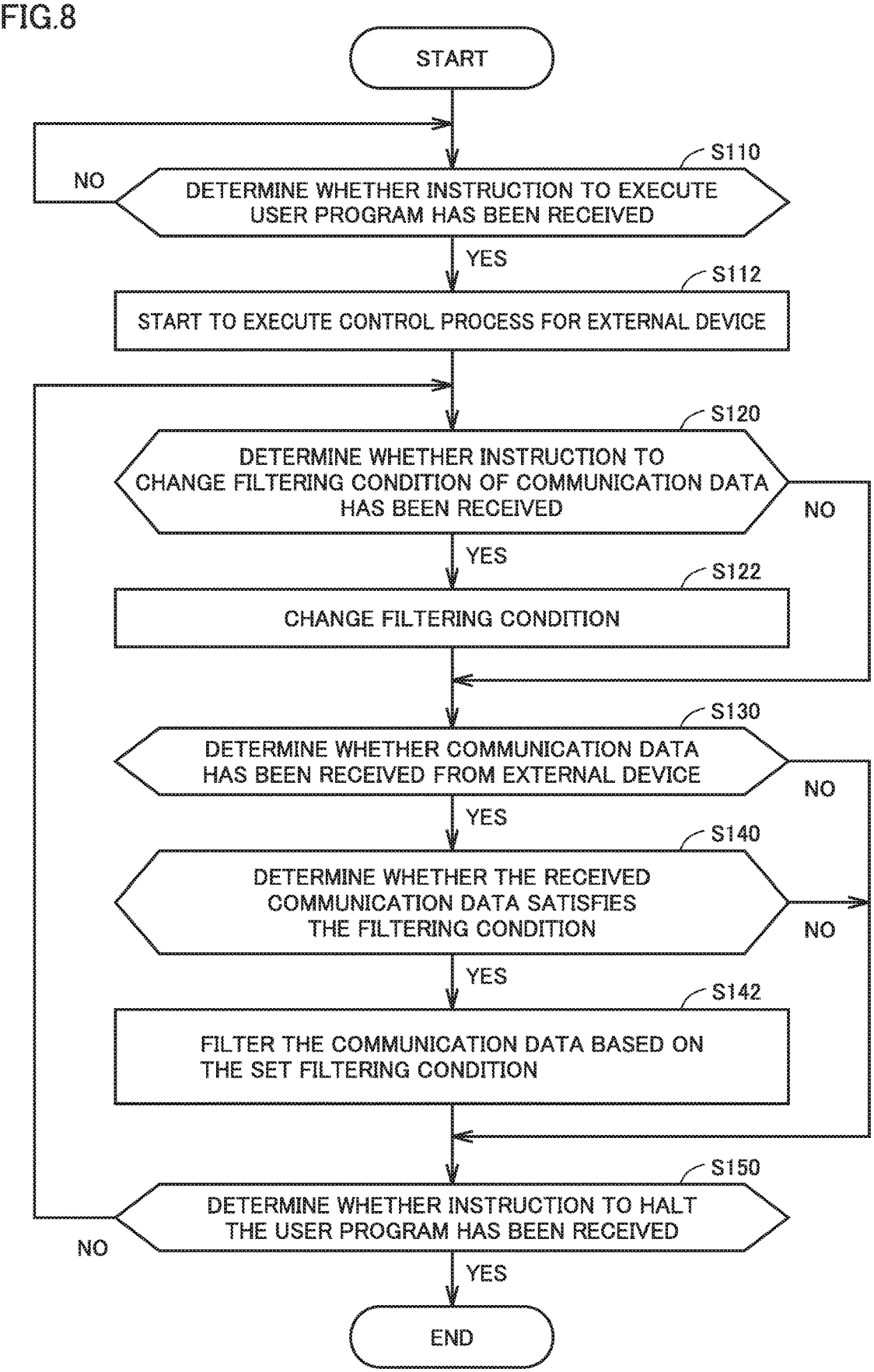
FIG. 8 is a flowchart of steps in part of a working process executed by a controller 10 according to embodiments.

The configuration for control of controller 10 is hereinafter described referring to FIG. 8. FIG. 8 is a flowchart of steps in part of the working process executed by controller 10 according to embodiments. In the process illustrated in FIG. 8, collecting function 201 changes the filtering conditions in accordance with instructions included in user program 110 of controller 10. In other aspects of this disclosure, the process to be executed may be implemented in part or in whole by a circuit element(s) or a hardware component(s).

In step S110, program execution module 103 of controller 10 determines whether an instruction to run user program 110 has been received. When receipt of the instruction to run user program 110 is confirmed (YES in step S110), program execution module 103 proceeds to step S112. Otherwise (NO in step S110), program execution module 103 executes the process of step S110 again.

In step S112, program execution module 103 executes an initializing process, for example, establishes communication with external device 200. Then, program execution module 103, by executing the control function defined in user program 110, starts to control external device 200.

In step S120, program execution module 103 determines whether an instruction to change filtering condition 112 of communication data has been received. For example, program execution module 103 determines receipt of the instruction to change filtering condition 112 when "True" (=ON) is inputted to input unit 155A illustrated with "Execute" (see FIG. 3).

When receipt of the instruction to change filtering condition 112 is confirmed (YES in step S120), program execution module 103 proceeds to step S122. Otherwise (NO in step S120), processor 102 causes the program execution module to proceed to step S130.

In step S122, program execution module 103 outputs instructions included in user program 110 to collecting function 201. Collecting function 201 changes the filtering conditions in accordance with instructions included in user program 110. For example, collecting function 201 changes values inputted to input units 155B to 155D illustrated in FIG. 3. How to change the filtering condition has been described earlier with reference to FIG. 3 and is not described again.

In step S130, program execution module 103 determines whether any kind of communication data has been received from external device 200. When receipt of any communication data from external device 200 is confirmed (YES in step S130), program execution module 103 proceeds to step S140. Otherwise (NO in step S130), program execution module 103 proceeds to step S150.

In step S140, collecting function 201 determines whether the communication data satisfies the filtering condition currently set. This communication data may be, for example, data transmitted from external device 200 to program execution module 103 through network controller 100. Collecting function 201 may extract, from among the communication data, at least one of the following pieces of information used for comparison with the filtering condition: identification information of external device 200 (for example, IP address), port number of external device 200, and communication protocol used at the time of receiving the communication data.

When the information for comparison satisfies the filtering condition (YES in step S140), program execution module 103 proceeds to step S142. Otherwise (NO in step S140), program execution module 103 proceeds to step S150.

In step S142, collecting function 201 collects communication data in accordance with the set filtering condition. Collecting function 201 stores the collected communication data in storage 108.

In step S150, program execution module 103 determines whether an instruction to halt user program 110 has been received. When receipt of the instruction to halt user program 110 is confirmed (YES in step S150), program execution module 103 ends the process illustrated in FIG. 8. Otherwise (NO in step S150), program execution module 103 returns to step S120.

G. Description of Collecting Function-Used Example

Figure 9:
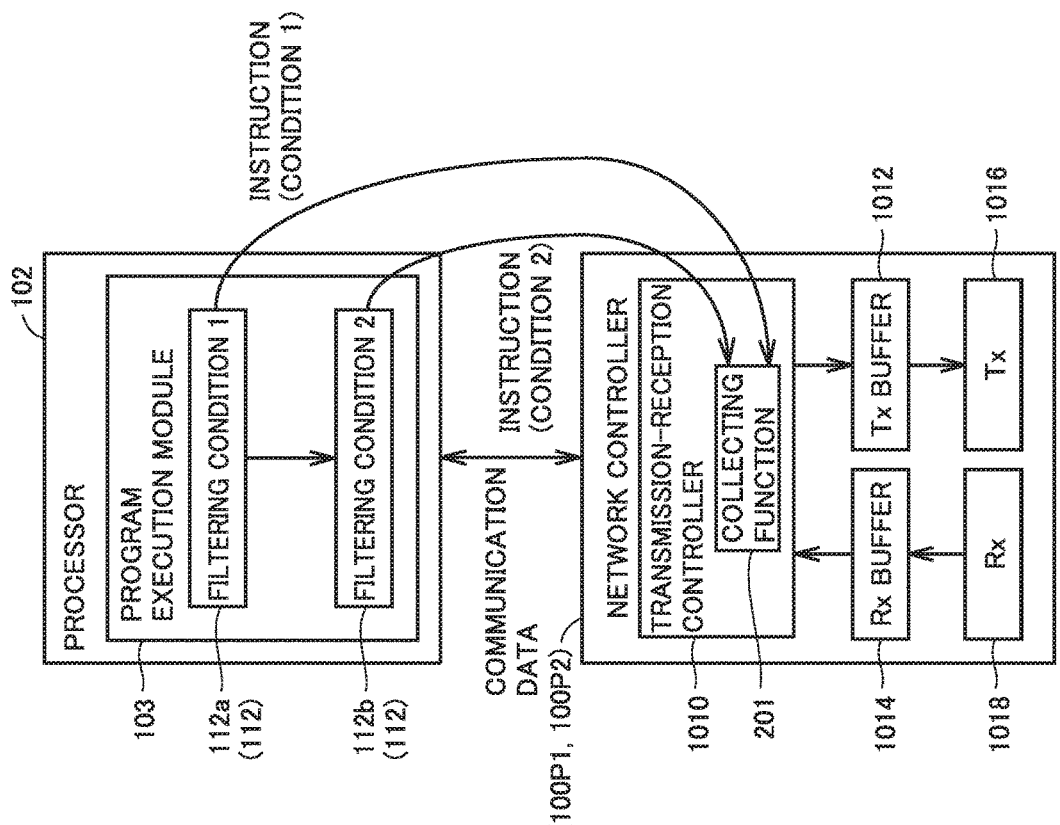
FIG. 9 is a diagram that illustrates where in the device processes are executed by a user program 110 and a collecting function 201 according to embodiments.
Figure 9:
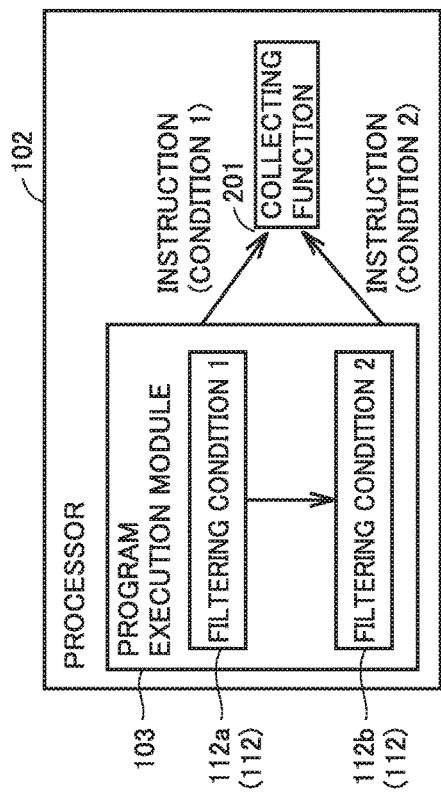

FIG. 9 is a diagram that illustrates where in the device processes are executed by user program 110 and collecting function 201 according to embodiments.

Specific examples of the device configuration using collecting function 201 and user program 110 of controller 10 are hereinafter described referring to FIG. 9. Processor 102 and network controller 100 (100P1, 100P2) illustrated in FIGS. 9(a) and 9(b) are essentially configured similarly to the ones illustrated in FIGS. 1 and 2. FIGS. 9(a) and 9(b) illustrate specific examples of the device configuration using user program 110 and collecting function 201 in charge of executing data filtering based on instructions included in user program 110.

In the example of FIG. 9(a), processor 102 executes processes in connection with user program 110. The filtering condition of collecting function 201 is changeable by processor 102 in accordance with instructions included in the user program. The processes of collecting function 201 are, therefore, executed by processor 102, similarly to user program 110.

In the example of FIG. 9(b), processor 102 executes processes in connection with user program 110. The filtering condition of collecting function 201 is changeable by processor 102 in accordance with instructions included in the user program. The processes of collecting function 201 are, on the other hand, executed by transmission-reception controller 1010 of network controller 100, unlike user program 110.

Thus, collecting function 201 is feasible by either one of processor 102 or network controller 100, and functions are flexibly replaceable depending on the processing load of each device and a user's intended purpose.

H. Wrap-Up Summary

Program execution module 103 of controller 10 transmits and/or receives the communication data to and/or from network controller 100. Program execution module 103 generates control instructions for a control target in accordance with user program 110 that is freely created by a user. Collecting function 201 is allowed to change filtering condition 112 of communication data in accordance with instructions included in user program 110.

Control device 10, by thus allowing the filtering conditions of collecting function 201 to be changed in accordance with instructions included in the user program, can dynamically change contents of the communication data to be collected. Thus, different pieces of communication data can be successfully collected depending on the current processing status. This may allow a particular piece(s) of the communication data needed to identify causal factors to be selectively collected in the case of any problems in data communication, allowing efficient use of a limited memory capacity of control device 10.

I. Other Examples of Application

Other examples of application of FA system 1 according to embodiments are hereinafter described.

I-1: Change of Filtering Condition Using Filtering Condition Table

Figure 10:
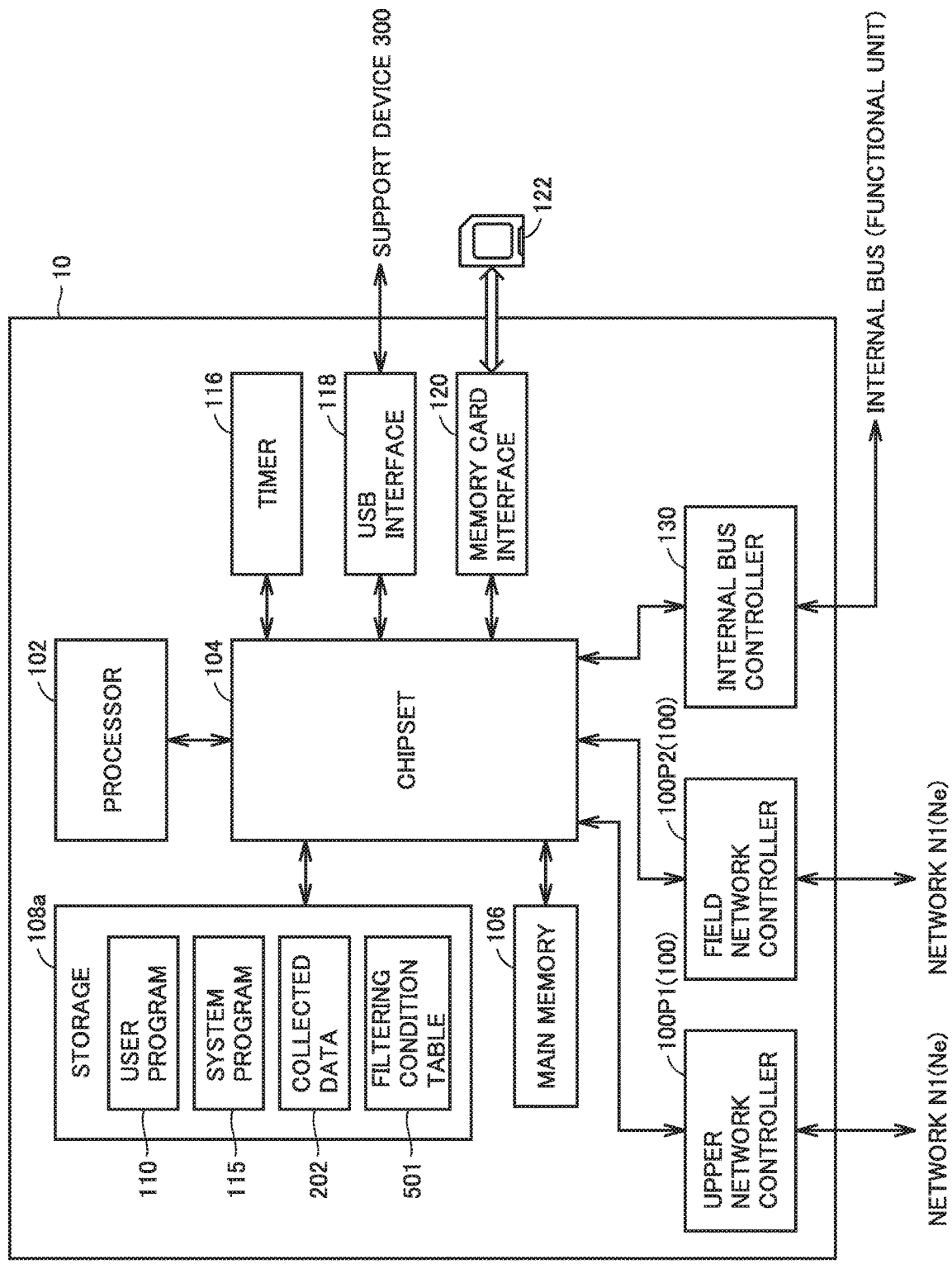
FIG. 10 is a block diagram that illustrates exemplified hardware components of controller 10 according to embodiments.

A first one of other examples of application is hereinafter described. FIG. 10 is a block diagram that illustrates exemplified hardware components of controller 10 according to embodiments. The structural example of FIG. 10 includes the same hardware components as those illustrated in FIG. 2. The description given below to FIG. 10 focuses on the description of differences to FIG. 2, while skipping any similar technical and structural aspects.

A storage 108a illustrated in FIG. 10 includes a filtering condition table 501 in addition to user program 110, system program 115 and collected data 202.

Filtering condition table 501 is a table provided for management of filtering conditions generated by a user using support device 300. Storage 108a of controller 10 stores therein filtering condition table 501 thus generated. In the description of FIG. 10, filtering condition table 501 is stored in storage device 108a apart from user program 110; however, filtering condition table 501 may be stored in user program 110.

FIG. 11 is a diagram that illustrates an example of filtering condition table 501. Filtering condition table 501 has the following entry items; number 502, specifying method 503, and IP address 504. Filtering condition table 501 further has the following entry items (parameters); subnet mask 505, protocol 506, range 507, port 1 508, port 2 509.

The entry of number 502 shows indicators, each of which represents a group of values of more than one entry of the filtering condition (parameter values). In the embodiments described thus far, contents of filtering condition 112 are explicitly stated in user program 110, and collecting function 201 changes the filtering condition in accordance with instructions directly indicative of the parameter values of the filtering condition.

In this example of application, on the other hand, parameter values with different filtering conditions are organized into one group and are each defined with an indicator (for example, number). The indicator thus defined is information that shows which one of more than one filtering condition is valid, which corresponds to instructions included in user program 110. Collecting function 201 is thus allowed to freely change the filtering condition indirectly in accordance with instructions indicative of parameter values of the filtering condition.

While a plurality of entries (parameters) are described below correspondingly to one indicator, there may be only one entry for each indicator. In this instance, one indicator is allocated to the value of one entry.

Of the entries in the table of FIG. 11, specifying method 503, IP address 504 and subnet mask 505 are relevant to a network layer; layer 3 (L3). Upon a user's operation to select the entry of specifying method 503, support device 300 allows input of values to the other entries. An example of specifying method 503 may be "specifying IP" for input of IP addresses, or "Interface Network" and "any" which require no specific value or data input to the entries. When the entry of "specifying IP" is selected in specifying method 503, a user can input specific values to the entries; IP address 504 and subnet mask 505. When input of values of the IP address and subnet mask from the user to these entries are received, support device 300 sets values in the entries of filtering condition table 501 relevant to layer 3.

Of the entries in the table of FIG. 11, protocol 506, range 507, port 1 508, and port 2 509 are relevant to a transport layer; layer 4 (L4). In FIG. 11, the user's operation to place a checkmark in the entry of range 507 enables inter-port condition setting. For example, when the user inputs "80" to the entry of port 1 and "100" to the entry of port 2 after range 507 is check-marked, such a condition is settable that communication data between ports 80 and 100 is selected as data to be filtered. The inter-port condition setting may be feasible otherwise, without check-marking range 507. For example, the range entry may be omitted so that a user can directly input values to the entries; port 1 and port 2, or directly input such a value that indicates target ports, like "80-100", to one entry.

When the protocol type, whether the range of port numbers is set, and port numbers are inputted by a user to these entries, support device 300 sets values in the entries of filtering condition table 501 relevant to layer 4. The "TCP" being selected in the entry of protocol 506 means the selection of any protocol using TCP in layer 4 (for example, HTTP).

Filtering condition table 501 thus generated includes a plurality of filtering conditions. Support device 300 stores generated filtering condition table 501 in storage 108a of controller 10.

In the illustrated example of filtering condition table 501, setting of the entries relevant to layers 3 and 4 has been described. Instead, values may be set for entries relevant to other layers, for example, application layer and/or data link layer.

Figure 12:
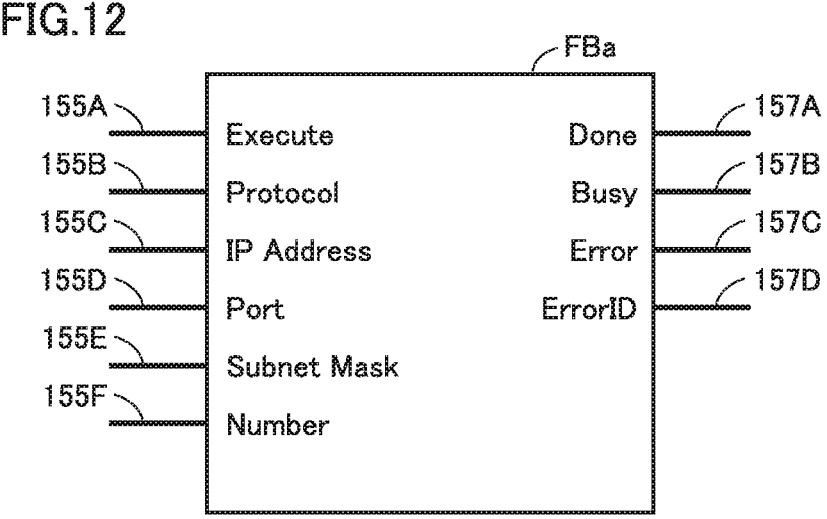
FIG. 12 is a diagram that illustrates a function block FBa according to embodiments.

FIG. 12 is a diagram that illustrates a function block FBa according to embodiments. The basic configuration of function block FBa illustrated in FIG. 12 is the same as function block FB described with reference to FIG. 3.

Function block FBa of FIG. 12 is distinct from function block FB of FIG. 3 in that function block FBa further includes input units 155E and 155F. Input unit 155F illustrated with "Number" in FIG. 12 receives input of indicators (for example, numbers) each representing a group of entries set in filtering condition table 501. Input unit 155F is allowed to receive values that indirectly indicate the filtering condition and thereby set the filtering condition.

Input unit 155E illustrated with "Subnet Mask" in FIG. 12 receives input of values for specifying the subnet mask of filtering condition table 501.

Figure 13:
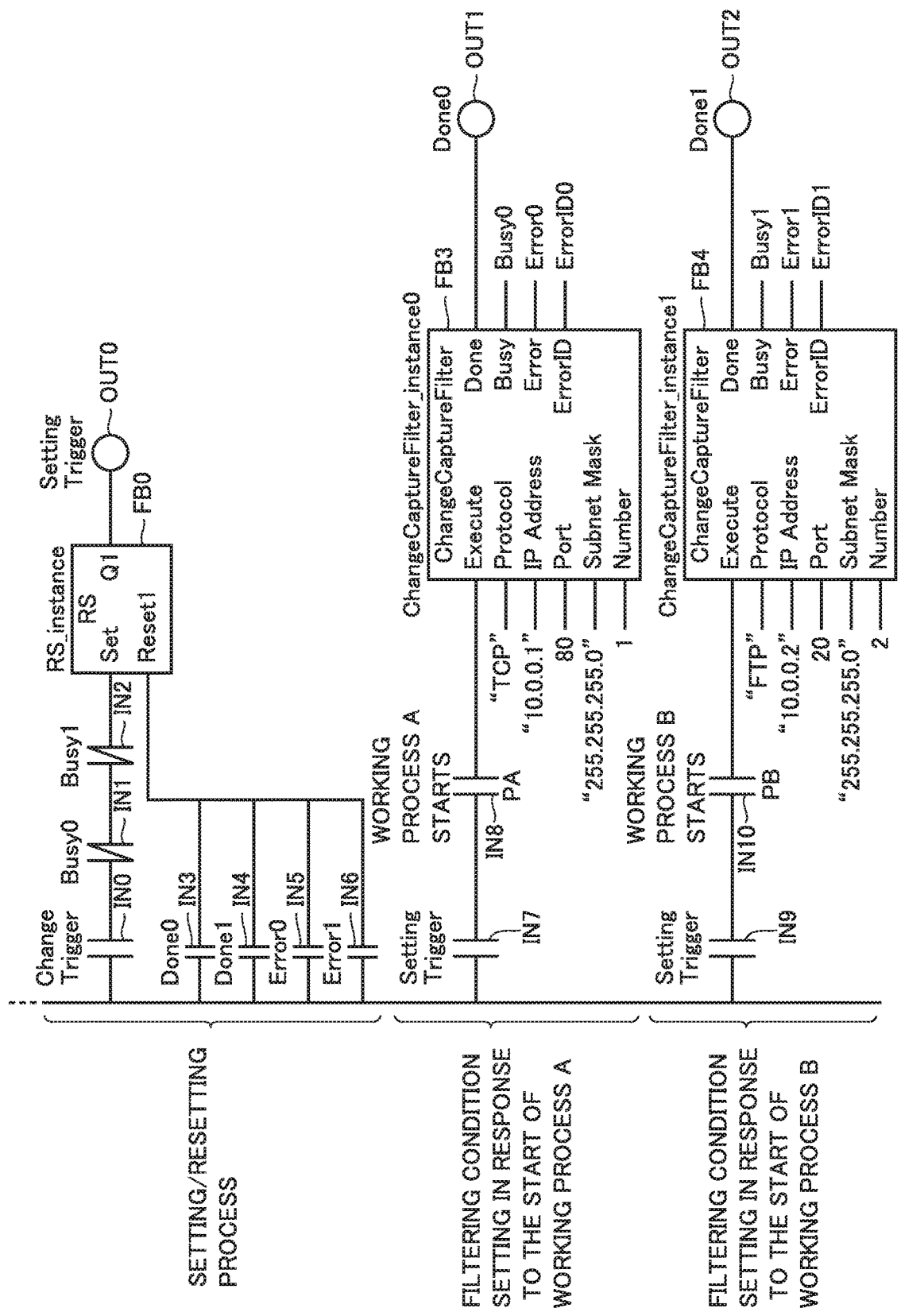
FIG. 13 is a diagram that illustrates an exemplified user program according to embodiments embedded with a function block FBa described with reference to FIG. 12.

An exemplified use of function block FBa illustrated in FIG. 12 is hereinafter described referring to FIG. 13. FIG. 13 is a diagram that illustrates an exemplified user program according to embodiments embedded with function block FBa described with reference to FIG. 12.

The ladder program illustrated in FIG. 13 and the ladder program described with reference to FIG. 4 are similarly configured, except for their function blocks that differ in part. Details of input unit "Number" and input unit "Subnet Mask", which are the difference between the function blocks, are hereinafter described referring to function blocks FB3 and FB4 illustrated in FIG. 13.

Function block FB3 sets values to be inputted to the other input units in answer to a value inputted to input unit "Number". Specifically, when the value inputted to input unit "Number" is "1", values corresponding to Number "1" in filtering condition table 510 of FIG. 11 are set in the other input units. More specifically, "TCP" is set in input unit "Protocol", as illustrated in function block FB3 of FIG. 13. Further, "10.0.0.1" is set in input unit "IP Address", and "80" is set in input unit "Port". Then, "255.255.255.0" is set in input unit "Subnet Mask".

Function block FB4 sets values to the other input units in answer to a value inputted to input unit "Number". Specifically, when "2" is the value inputted to input unit "Number", values in the entries corresponding to Number "2" in filtering condition table 501 illustrated in FIG. 11 are set in the other input units. Specific values inputted to the respective input units are; "FTP" to "Protocol", "10.0.0.2" to "IP Address", "20" to "Port", and "255.255.255.0" to "Subnet Mask".

By thus inputting, to the input unit, a number value indirectly indicative of the filtering condition, parameter values predefined in the table are set as input values in the other input units.

The instructions included in user program 110 include information (for example, number) that indicates which one is valid among the filtering conditions included in filtering condition table 510 prestored in storage 108a. Thus, the filtering conditions are changeable based on the information indirectly indicative of the filtering condition. This can facilitate a user freely setting a target piece of communication data to be collected depending on the current status of the working process.

Either one of processor 102 or network controller 100 may execute the process to change the filtering conditions based on filtering condition table 501 stored in storage 108a.

I-2: Process to Generate Filtering Conditions Using Support Device (Example 1)

An exemplified process to generate the filtering conditions using support device 300 is hereinafter described referring to FIGS. 14 to 17.

[(1) Obtaining Communication Data]

Figure 14:
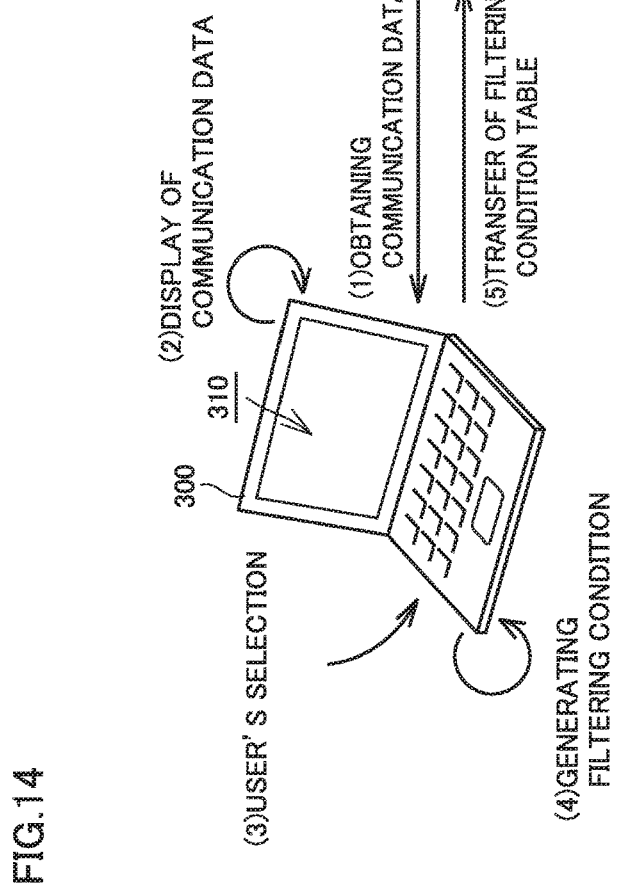
FIG. 14 is a diagram that illustrates an exemplified filtering condition generating flow using a support device 300 according to embodiments.

FIG. 14 is a diagram that illustrates an exemplified filtering condition generating flow using support device 300 according to embodiments. First, support device 300 obtains communication data outputted from controller 10. Next, processor 102 of controller 10 stores, in storage 108, the communication data received by network controller 100. Controller 10 outputs, to support device 300, a communication data 156 stored in storage 108.

[(2) Display of Communication Data]

Support device 300 displays communication data 156 received from controller 10 on a display unit 310.

Figure 15:
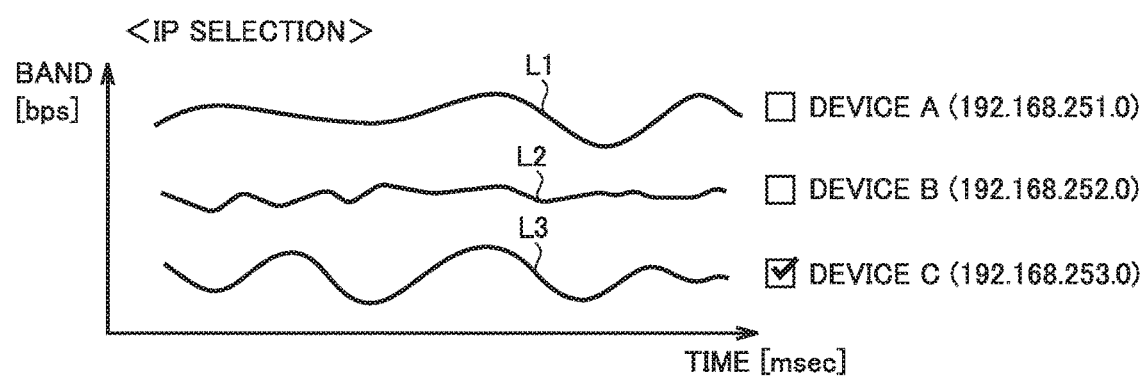
FIG. 15 is a diagram that illustrates changes with time in speed of transmitting communication data in a plurality of external devices 200 (IP addresses) according to embodiments.
Figure 16:
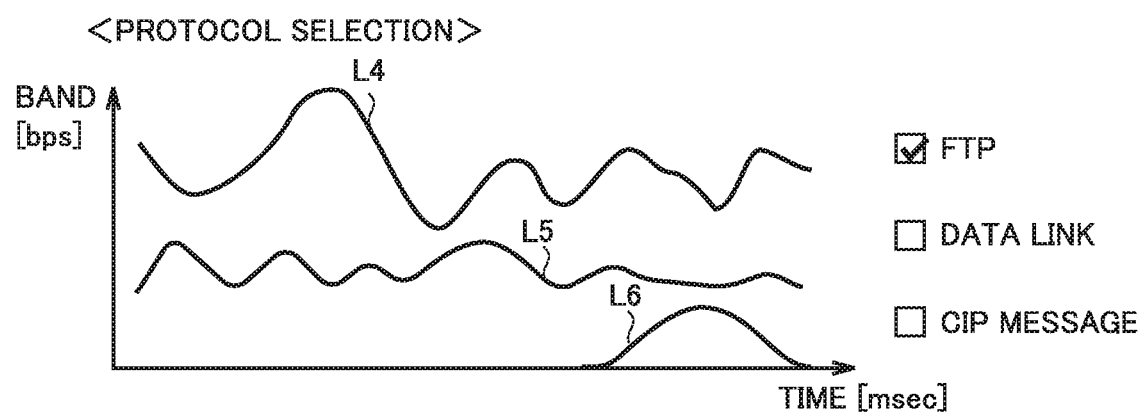
FIG. 16 is a diagram that illustrates changes with time in speed of transmitting communication data that comply with a plurality of protocols according to embodiments.

FIG. 15 is a diagram that illustrates changes with time in speed of transmitting communication data in a plurality of external devices 200 (IP addresses) according to embodiments. FIG. 16 is a diagram that illustrates changes with time in speed of transmitting communication data that comply with a plurality of protocols according to embodiments. In FIGS. 15 and 16, vertical axes show the transmission speed (bps) of communication data per unit time, and horizontal axes show time (msec).

In FIG. 15 are illustrated fluctuation lines L1 to L3 of transmission speeds in three external devices 200 (external devices A to C). The fluctuation lines are specifically; L1 is of external device A, L2 is of external device B, and L3 is of external device C.

In FIG. 16 are illustrated fluctuation lines of L4 to L6 of transmission speeds in three different protocols (FTP, data link, CIP message). The fluctuation lines are specifically; L4 is of FTP, L5 is of data link, and L6 is of CIP message.

(3) User's Selection

Display unit 310 of support device 300 displays, to a user, fluctuation lines L1 to L6 illustrated in FIGS. 15 and 16. A user who manipulates support device 300 may select one of external devices 200 having a lower transmission speed, as indicated with fluctuation line L3, than the other devices 200 (for example, external device C). Then, the user who manipulates support device 300 may select one of the protocols having a greater fluctuation band in transmission speed, as indicated with fluctuation line L4, than the other protocols (for example, FTP protocol). Support device 300 thus selects values to be set in the entries used to generate the filtering conditions in answer to a user's operation.

While three external devices (IP addresses) and three protocols were used in the description of FIGS. 15 and 16, the number of devices and the protocol type to be selected are not necessarily thus limited and may be decided otherwise. Specifically, there may be two or less or four or more protocols, and the protocol type to be selected may be, for example, MAC address.

When support device 300 generates the filtering conditions as described above, processor 102 may output all of pieces of communication data 156, without filtering them, to support device 300, or may set a particular filtering condition and then output the filtered communication data alone to support device 300.

(4) Generating Filtering Conditions

Referring to FIG. 14 again, support device 300 generates the filtering conditions using the relevant entry items selectable by a user.

FIG. 17 is a diagram that illustrates exemplified filtering conditions generated as a result of filtering condition entry items being selected according to embodiments.

A filtering condition table 501a illustrated in FIG. 17 is essentially similar to but is distinct in part from filtering condition table 501 described with reference to FIG. 11. Below are described such differences between these tables.

In filtering condition table 501a of FIG. 17, "6" is added to the numbers "1" to "5" in the entry of number 502 of filtering condition table 501 illustrated in FIG. 11. In the respective entries of layers 3 (L3) and 4 (L4) in "6" of number 502, the protocol (FTP) value and the IP address (192.268.251.0) of external device A selected by a user manipulating support device 300, as described in connection with FIGS. 15 and 16, have been inputted to the entries; IP address 504 and protocol 506. In response to the IP address and protocol being selected, values have been inputted to the relevant entries, subnet mask 505 and port 1 508. The "TCP" being selected in the entry of protocol 506 means the selection of any protocol using TCP in layer 4 (for example, HTTP).

(5) Transfer of Filtering Condition Table

Support device 300 transfers generated filtering condition table 501a to controller 10.

Controller 10 stores, in storage 108, filtering condition table 501a received from support device 300.

Thus, a user may be allowed to generate the filtering conditions suitable for the current communication status, while checking the current transmission speed of communication data using support device 300.

In the description earlier, support device 300 generates the filtering conditions in answer to a user's selection. Instead, support device 300 may automatically select any one(s) of the entries relevant to the filtering conditions without the need to reply on a user's input. Specifically, the protocol entry with a transmission speed lower than or equal to a predetermined speed may be automatically selected. This may allow support device 300 to generate optimal filtering conditions for the current communication status. Also, controller 10 may be allowed to collect communication data by selecting the filtering conditions most desirable for the current communication status.

I-3: Process to Generate Filtering Conditions Using Support Device (Example 2)

Figure 18:
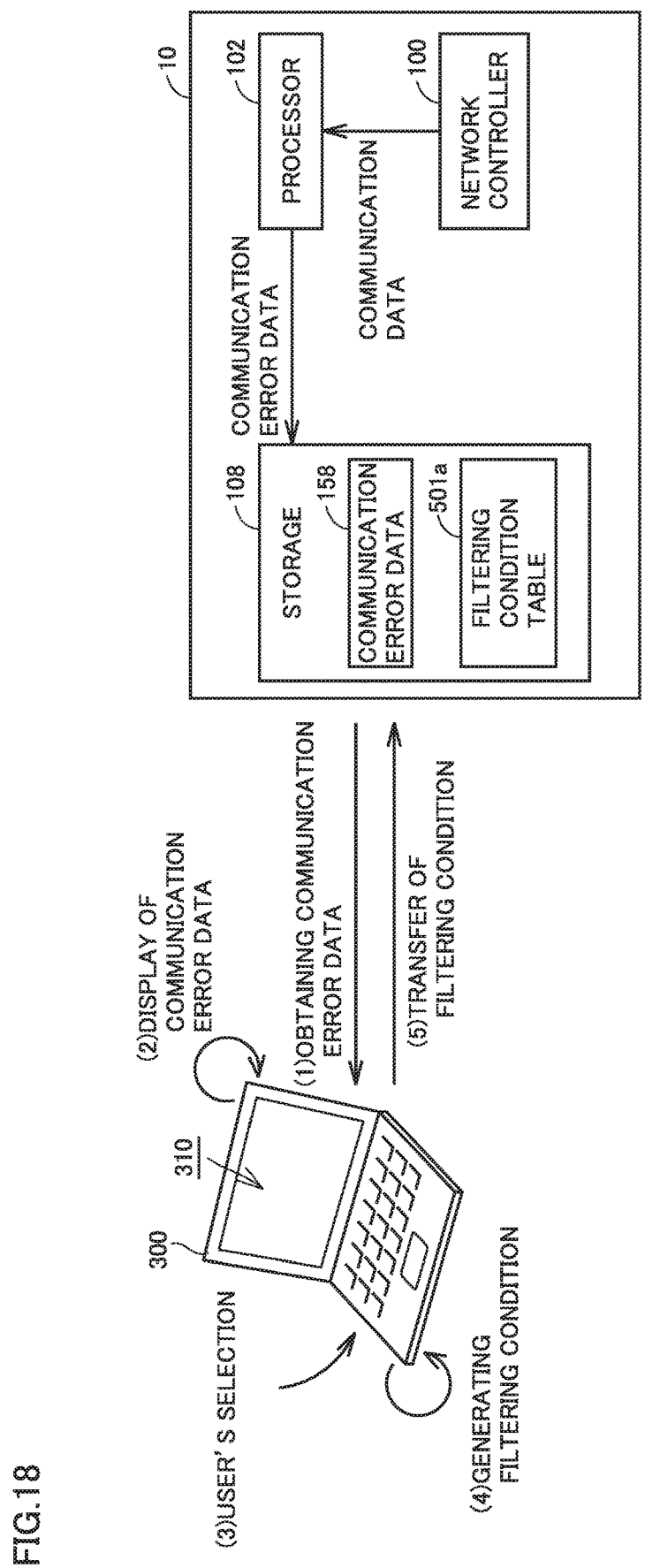
FIG. 18 is a diagram that illustrates another example of the filtering condition generating flow using support device 300 according to embodiments.

FIG. 18 is a diagram that illustrates another example of the filtering condition generating flow using support device 300 according to embodiments. In the process to generate the filtering conditions described with reference to FIG. 14, a user generates the filtering conditions using support device 300 based on the changes in speed of transmitting communication data 156. On the other hand, FIG. 18 illustrates a process to generate the filtering conditions based on the number of communication errors (frequency).

[(1) Obtaining Communication Data]

First, support device 300 obtains communication error data outputted from controller 10.

Processor 102 of controller 10 illustrated in FIG. 18 stores communication data received by network controller 100 in storage 108 and outputs a communication error data 158 to support device 300.

The communication error data presents a value indicative of the number of data communication errors, an example of which is a value indicative of the number of timeouts or retries of data communication. To obtain the value indicative of the number of communication errors, controller 10 may automatically count the number of timeouts or retries of data communication, or a user may count the number of timeouts or retries using support device 300, while checking the current status of data communication on this support device.

[(2) Display of Communication Data]

Next, support device 300 displays, on display unit 310, communication error data 158 obtained from controller 10.

FIG. 19 is a diagram that illustrates an image displayed on display unit 310 of support device 300 according to embodiments, indicating the number of times when data communication errors occur. The displayed image of FIG. 19 indicating the number of communication errors includes the following entries; time 602, select checkbox 603, number of timeouts 605, and number of retries 606.

In the entry of time 602, a user is allowed to select any time slot between a present time point and a time point earlier by several minutes or hours. Specifically, a user may set, in the entry of time 602, any time slot from, for example, "last 30 minutes", "last 1 hour", and "last 2 hours". The time slots in the entry of time 602 may be thus half-hourly or hourly set or may be set by a user for every 10 minutes or every two hours. In the example of FIG. 19, a user selects "last 1 hour" in the entry of time 602, followed by display of protocol types of communication data and the number of communication errors generated for each of the protocol types in the last one hour.

[(3) User's Selection]

In "TCP" in the entry of protocol 604, "10" is displayed in the number of timeouts 605, and "8" is displayed in the number of retries 606. In "FTP" in the entry of protocol 604, "5" is displayed in the number of timeouts 605, and "0" is displayed in number of retries 606. The user, who thus confirmed the number of communication errors, marks one of the protocols with more communication errors (for example, TCP) in the entry of select checkbox 603.

[(4) Generating Filtering Conditions]

Referring to FIG. 18 again, support device 300 generates the filtering conditions using the relevant entry items selectable by a user. The process to generate the filtering conditions, which is similar to the process illustrated in FIG. 17, is not described again.

[(5) Transfer of Filtering Condition Table]

Support device 300 transfers generated filtering condition table 501a to controller 10.

Controller 10 stores, in storage 108, filtering condition table 501a received from support device 300. Thus, a user may be allowed to generate the filtering conditions suitable for the current communication status, while checking the number of communication errors of communication data using support device 300.

In the description earlier, support device 300 generates the filtering conditions in answer to a user's selection. Instead, support device 300 may automatically select any one(s) of the entries relevant to the filtering conditions without the need to reply on a user's input. Specifically, any protocol with the number of communication errors greater than or equal to a predetermined value may be automatically selected. In the example of FIG. 19, one of the entries is protocol. However, other entries may be included instead of or in addition to the protocol, for example, IP address, port number, and MAC address. This may allow support device 300 to generate optimal filtering conditions for the current communication status. Also, controller 10 may be allowed to collect communication data by selecting the filtering conditions most desirable for the current communication status.

J. Modified Example

While the filtering conditions are changed in accordance with the working process in the description given so far, user program 110 may be programmed to change the filtering conditions in accordance with other statuses. For example, user program 110 may be programmed to set the filtering conditions suitable for the system configuration of FA system 1 in case external device 200 of FA system 1 is reconfigured. This may allow controller 10 to block any undesired communication devices if they are accidentally or intentionally connected to controller 10. Whether a communication device(s) is connected or not connected may be detected by using a function block(s) that monitors the current network status. Such a function block may monitor the status of a network table at regular intervals and detect from information of changes in the network table whether a communication device(s) is connected or not connected.

For example, user program 110 may be programmed to set filtering conditions that prevent any ill-intentioned attack from an external apparatus if the control device is under such an attack. In this instance, the communication driver of controller 10 monitors the volume of received data per unit time (for example, the number of received packets per unit time) and confirms that an ill-intentioned attack from an external apparatus is occurring when the volume of received data exceeds a predetermined threshold. Upon the detection of such an ill-intentioned attack from an external apparatus, collecting function 201 blocks the external apparatus responsible for the attack based on information of, for example, IP address and/or port number. Alternatively, collecting function 201 may block all of incoming communication packets upon the detection of any ill-intentioned attack from an external apparatus.

For possible changes in communication-related connections of controller 10, user program 110 may be programmed to set filtering conditions in accordance with the current status of such connections. For example, collecting function 201 may only allow passage of data received from a source device once the communication with the source device is established until the connection to this device is lost, while blocking any data from the source device otherwise. Thus, collecting function 201, by thus allowing passage of communication data during a required period of time, can successfully provide an improved level of security.

K. Supplementary Note

As described thus far, the embodiments include the following disclosure.

[Configuration 1] A control device (10) that controls a control target is provided. Control device (10) includes:

a program execution module (103) that generates control instructions for a control target in accordance with a user program (110) that is freely created;

a communication unit (100) that transmits and/or receives communication data to and/or from an external device (200) through a network (Ne); and a collection module (201), connected to communication unit (100), that collects data satisfying a filtering condition (112) from among the communication data that is transferred on the network (Ne).

Collection module (201) changes filtering condition (112) in accordance with an instruction included in user program (110).

[Configuration 2] The control device as described in configuration 1, further characterized in that the instruction included in user program (110) includes an instruction explicitly stating contents of filtering condition (112).

[Configuration 3] The control device as described in configuration 1, further including a storage (108) that stores therein a plurality of preset filtering conditions (112). The instruction included in user program (110) includes information that indicates which one of the plurality of preset filtering conditions (112) is valid.

[Configuration 4] The control device as described in any one of configurations 1 to 3, further characterized in that filtering condition (112) includes at least one of an IP address, a protocol, and a port number.

[Configuration 5] The control device as described in any one of configurations 1 to 4, further characterized in that collection module (201) starts to collect the communication data on the condition that a value of a variable that is usable in user program (110) matches a predetermined value.

[Configuration 6] The control device as described in configuration 5, further characterized in that a value of the variable indicates a current status of a working process carried out by external device (200).

[Configuration 7] A control method for controlling a control target is provided. The control method includes steps of:

(S112) generating control instructions for the control target in accordance with a user program (110) that is freely created;

(S112) transmitting and/or receiving communication data to and/or from an external device (200) through a network (Ne); and (S142) collecting data satisfying a filtering condition (112) from among the communication data that is transferred on the network (Ne).

The step (S142) of collecting the data includes allowing filtering condition (112) to be changed in accordance with an instruction included in user program (110).

[Configuration 8] A control program for a control device that controls a control target is provided. The control program causes the control device to perform:

(S112) generating control instructions for the control target in accordance with a user program (110) that is freely created;

(S112) transmitting and/or receiving communication data to and/or from an external device through a network (Ne); and (S142) collecting data satisfying a filtering condition (112) from among the communication data that is transferred on the network (Ne).

The step (S142) of collecting the data includes allowing filtering condition (112) to be changed in accordance with an instruction included in user program (110).

The embodiments disclosed herein are given by way of example in all aspects and should not be construed as limiting the scope of this disclosure. The scope of this disclosure is solely defined by the appended claims and is intended to cover the claims, equivalents, and all of possible modifications made without departing the scope of this disclosure.

REFERENCE SIGNS LIST

1: FA system, 10: Control device, 100: Network controller, 100P1: Upper network controller, 100P2: Field network controller, 102: Processor, 103: Program execution module, 104: Chipset, 106: Main memory, 108, 108a: Storage, 110: User program, 111: Communication application, 501, 501a: Filtering condition table, 115: System program, 116: Timer, 120: Memory card interface, 122: Memory card, 130: Internal bus controller, 155A, 155B, 155C, 155D, 155E, 155F: Input unit, 156: Communication data, 157A, 157B, 157C, 157D: Output unit, 158: Communication error data, 200: External device, 200A: Server, 200B: Display unit, 200C: Image sensor, 200D: Camera, 200E: Remote I/O device, 200F: Arm robot, 200P1, 200P2: Communication port, 201: Collecting function, 202, 202a, 202b: Collected data, 300: Support device, 310: Display unit, 502: Number, 503: Specifying method, 504: Address, 505: Subnet mask, 506: Protocol, 602: Time, 603: Selected entries, 604: Protocol, 605: Number of timeouts, 606: Number of Retries, 1010: Transmission-reception controller, 1012: Transmission buffer, 1014: Reception buffer, 1016: Transmission circuit, 1018: Reception circuit

The invention claimed is:

1. A control device comprising a programmable logic controller (PLC) that controls a control target, comprising:
a program execution module that generates control instructions for the control target in accordance with a user program that is freely created;
a communication unit that transmits and/or receives communication data to and/or from an external device through a network; and
a collection module, connected to the communication unit, that collects data satisfying a filtering condition from among the communication data that is transferred on the network, wherein the collection module changes the filtering condition in accordance with an instruction defined with a function block included in the user program, wherein the function block comprises one or more inputs and one or more outputs, each of the one or more input and one or more outputs comprising an assigned one or more of: a specific type; and a specific definition, a success of setting the filtering conditions are changeable by values input to the one or more inputs to the function block, and a status of setting the filtering conditions is output from the one or more outputs.

2. The control device according to claim 1, wherein the instruction included in the user program comprises an instruction explicitly stating contents of the filtering condition.

3. The control device according to claim 1, further comprising a storage that stores therein a plurality of preset filtering conditions, wherein the instruction included in the user program comprises information that indicates which one of the plurality of preset filtering conditions is valid.

4. The control device according to claim 1, wherein the filtering condition includes at least one of an IP address, a protocol and a port number.

5. The control device according to claim 1, wherein the collection module starts to collect the communication data on the condition that a value of a variable that is usable in the user program matches a predetermined value.

6. The control device according to claim 5, wherein a value of the variable indicates a current status of a working process carried out by the external device.

7. A control method implemented in a processor comprising a programmable logic controller (PLC) for controlling a control target, comprising:

generating control instructions for the control target in accordance with a user program that is freely created;

transmitting and/or receiving communication data to and/or from an external device through a network; and collecting data satisfying a filtering condition from among the communication data that is transferred on the network, wherein the collecting the data comprises allowing the filtering condition to be changed in accordance with an instruction defined with a function block included in the user program, wherein the function block comprises one or more inputs and one or more outputs, each of the one or more input and one or more outputs comprising an assigned one or more of: a specific type; and a specific definition, a success of setting the filtering conditions are changeable by values input to the one or more inputs to the function block, and a status of setting the filtering conditions is output from the one or more outputs.

8. The control method according to claim 7, wherein the instruction included in the user program comprises an instruction explicitly stating contents of the filtering condition.

9. The control method according to claim 7, further comprising storing a plurality of preset filtering conditions in a storage, wherein the instruction included in the user program comprises information that indicates which one of the plurality of preset filtering conditions is valid.

10. The control method according to claim 7, wherein the filtering condition includes at least one of an IP address, a protocol and a port number.

11. The control method according to claim 7, wherein the collecting data starts on the condition that a value of a variable that is usable in the user program matches a predetermined value.

12. The control method according to claim 11, wherein a value of the variable indicates a current status of a working process carried out by the external device.

13. A non-transitory storage medium storing therein a control program for a control device comprising a programmable logic controller (PLC) that controls a control target, the control program causes the control device to perform:

generating control instructions for the control target in accordance with a user program that is freely created;

transmitting and/or receiving communication data to and/or from an external device through a network; and collecting data satisfying a filtering condition from among the communication data that is transferred on the network, wherein the collecting the data comprises allowing the filtering condition to be changed in accordance with an instruction defined with a function block included in the user program, wherein the function block comprises one or more inputs and one or more outputs, each of the one or more input and one or more outputs comprising an assigned one or more of: a specific type; and a specific definition, a success of setting the filtering conditions are changeable by values input to the one or more inputs to the function block, and a status of setting the filtering conditions is output from the one or more outputs.

14. The non-transitory storage medium according to claim 13, wherein the instruction included in the user program comprises an instruction explicitly stating contents of the filtering condition.

15. The non-transitory storage medium according to claim 13, wherein the control program further causes the control device to perform storing a plurality of preset filtering conditions in a storage, and the instruction included in the user program comprises information that indicates which one of the plurality of preset filtering conditions is valid.

16. The non-transitory storage medium according to claim 13, wherein the filtering condition includes at least one of an IP address, a protocol and a port number.

17. The non-transitory storage medium according to claim 13, wherein the collecting data starts on the condition that a value of a variable that is usable in the user program matches a predetermined value.

18. The non-transitory storage medium according to claim 17, wherein a value of the variable indicates a current status of a working process carried out by the external device.

* * * * *